United States Patent
Barnes et al.

(10) Patent No.: US 6,552,677 B2
(45) Date of Patent: Apr. 22, 2003

(54) METHOD OF ENVELOPE DETECTION AND IMAGE GENERATION

(75) Inventors: Mark A. Barnes, Madison, AL (US); Soumya K. Nag, Huntsville, AL (US); Herbert U. Fluhler, Madison, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 10/083,191

(22) Filed: Feb. 26, 2002

(65) Prior Publication Data

US 2002/0175850 A1 Nov. 28, 2002

Related U.S. Application Data

(60) Provisional application No. 60/271,499, filed on Feb. 26, 2001.

(51) Int. Cl.$^7$ .............................................. G01S 13/00
(52) U.S. Cl. ............................................ 342/22; 342/25
(58) Field of Search ......................... 342/22, 25, 176, 342/177, 179

(56) References Cited

U.S. PATENT DOCUMENTS

| | | | |
|---|---|---|---|
| 4,698,663 A | 10/1987 | Lamensdorf et al. | 342/42 |
| 4,857,859 A | 8/1989 | Asahi et al. | 329/104 |
| 5,319,377 A | 6/1994 | Thomas et al. | 343/700 |
| 5,339,080 A * | 8/1994 | Steinway et al. | 342/22 |
| 5,339,282 A * | 8/1994 | Kuhn et al. | 367/7 |
| 5,361,077 A | 11/1994 | McEwan | 342/21 |
| 5,455,593 A | 10/1995 | Ross | 342/375 |
| 5,457,394 A | 10/1995 | McEwan | 324/642 |
| 5,465,094 A | 11/1995 | McEwan | 342/28 |
| 5,499,029 A | 3/1996 | Bashforth et al. | 342/22 |
| 5,512,834 A | 4/1996 | McEwan | 324/642 |
| 5,519,400 A | 5/1996 | McEwan | 342/28 |
| RE35,607 E * | 9/1997 | Nagamune et al. | 702/158 |
| 5,754,115 A * | 5/1998 | Woo | 340/665 |
| 5,757,320 A | 5/1998 | McEwan | 342/387 |
| 5,805,110 A | 9/1998 | McEwan | 342/387 |
| 5,854,603 A | 12/1998 | Heger | 342/85 |
| 5,891,038 A * | 4/1999 | Seyed-Bolorforosh et al. | 600/447 |

(List continued on next page.)

OTHER PUBLICATIONS

Teh–Hong Lee and Walter D. Burnside, Stray Signal Requirements for Compact Range Reflectors Based on RCS Measurement Errors, IEEE Transactions on Antennas and Propagation, vol. 39, No. 8, Aug. 1991, pp. 1193–1202.

Inder J. Gupta, David G. Brown, and Walter D. Burnside, A Serrated Edge Gregorian Subreflector for Dual Chamber Compact Range Systems, IEEE Transactions on Antennas and Propagation, vol. 39, No. 8, Aug. 1991, pp. 1258–1261.

(List continued on next page.)

*Primary Examiner*—Thomas H. Tarcza
*Assistant Examiner*—Isam Alsomiri
(74) *Attorney, Agent, or Firm*—George P. Kobler, Esq.

(57) ABSTRACT

A method of detecting objects reflecting impulse waveforms of generating a detection envelope by receiving a reflected waveform, delaying said waveform by a peak-to-zero delay (PZD) interval. The PZD interval is the time between a maximum energy displacement in the impulse waveform and an adjacent zero crossing. The reflected waveform and its delayed version are squared and then summed to create the envelope. If the envelope is to be defined in terms of voltage, the root of the sum of the squares may be found. Also a method for generating an image using the PZD interval in back-projection techniques is described wherein a sampling point is chosen on each of a plurality of reflected waveforms. The values of the samples are summed and the waveforms are delayed by the PZD interval and the values of the sampling points are again summed. The two sums are squared and added together to generate an image envelope.

8 Claims, 19 Drawing Sheets

U.S. PATENT DOCUMENTS

| | | | |
|---|---|---|---|
| 5,896,102 A | 4/1999 | Heger | 342/85 |
| 5,900,833 A | 5/1999 | Sunlin et al. | 342/22 |
| 5,966,090 A | 10/1999 | McEwan | 342/27 |
| 5,986,600 A | 11/1999 | McEwan | 342/28 |
| 5,986,602 A | 11/1999 | Frink | 342/126 |
| D419,546 S | 1/2000 | Krantz et al. | D14/116 |
| 6,137,438 A | 10/2000 | McEwan | 342/134 |
| 6,177,903 B1 | 1/2001 | Fullerton et al. | 342/28 |
| 6,210,332 B1 * | 4/2001 | Chiao et al. | 600/443 |
| 6,249,113 B1 | 6/2001 | Krantz et al. | |

OTHER PUBLICATIONS

Steven W. Ellingson, Inder J. Gupta, and Walter D. Burnside, Analysis of Blended Rolled Edge Relfectors Using Numerical UTD, IEEE Transactions on Antennas and Propagation, vol. 38, No. 12, Dec. 1990, pp. 1969–1971.

Inder J. Gupta, Kurt P. Ericksen, and Walter D. Burnside, A Method to Design Blended Rolled Edges for Compact Range Reflectors, IEEE Transactions on Antennas and Propagation, vol. 38, No. 6, Jun. 1990, pp. 853–861.

Teh–Hong Lee and Walter D. Burnside, Compact Range Reflector Edge Treatment Impact on Antenna and Scattering Measurements, IEEE Transactions on Antennas and Propagation, vol. 45, No. 1, Jan. 1997, p. 57–65.

Teh–Hong Lee and Walter D. Burnside, Performance Trade–Off Between Serrated Edge and Blended Rolled Edge Compact Range Reflectors, IEEE Transactions on Antennas and Propagation, vol. 44, No. 1, Jan. 1996, pp. 87–96.

Carl W. I. Pistorius and Walter D. Burnside, An Improved Main Reflector Design for Compact Range Applications, IEEE Transactions on Antennas and Propagation, vol. AP–35, No. 3, Mar. 1987, pp. 342–347.

Walter D. Burnside, Melvin C. Gilbreath, Brian M. Kent, and Giancarlo L. Clerici, Curved Edge Modification of Compact Range Reflector, IEEE Transactions on Antennas and Propagation, vol. AP–35, No. 2, Feb. 1987, pp. 176–182.

* cited by examiner

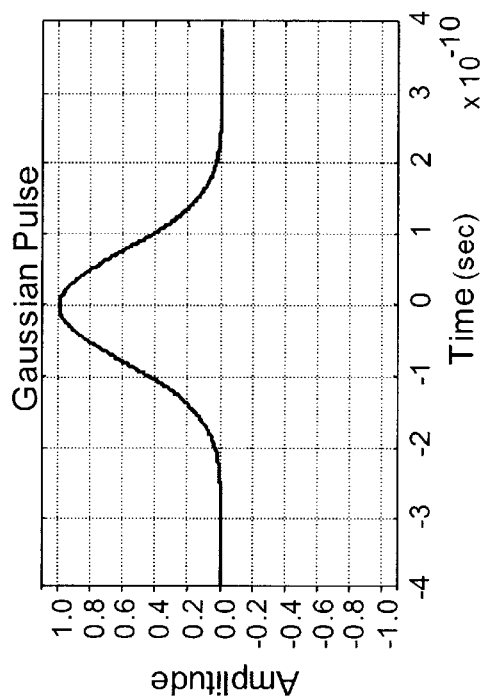
FIG. 1A
FIG. 1B
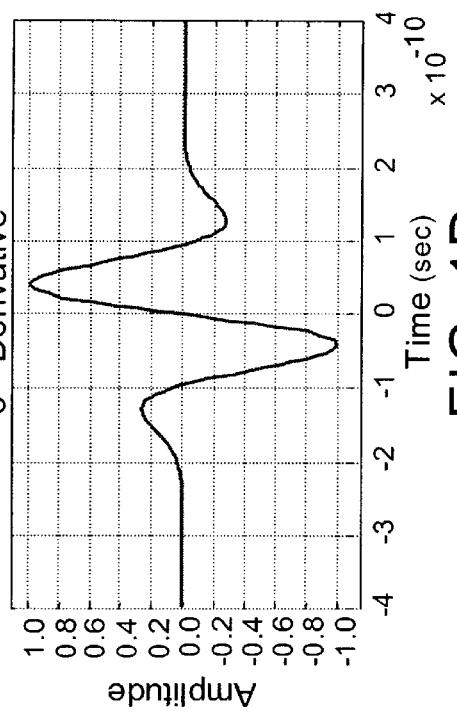
FIG. 1C
FIG. 1D

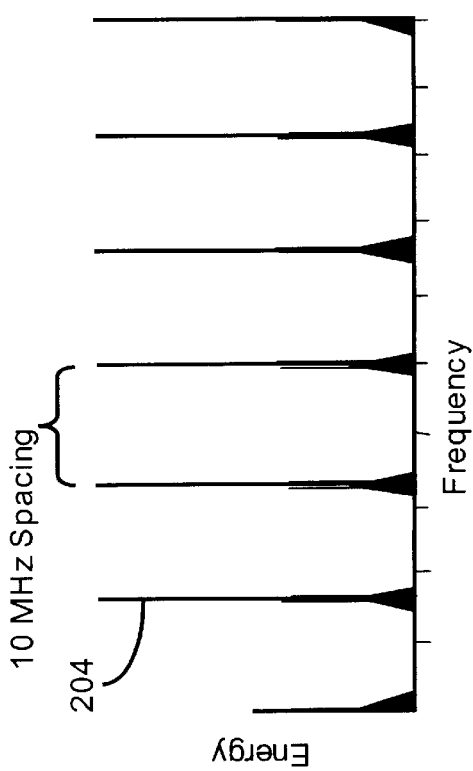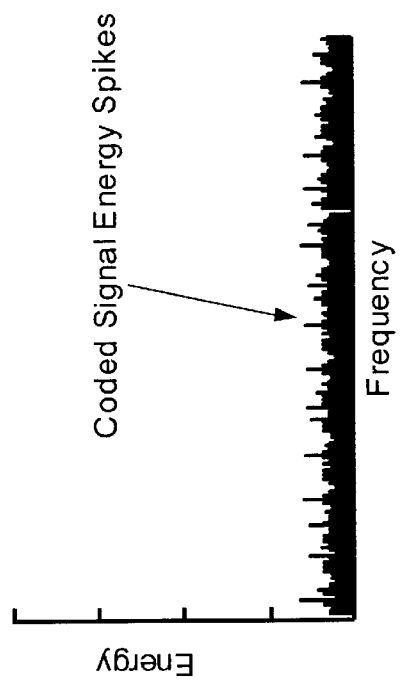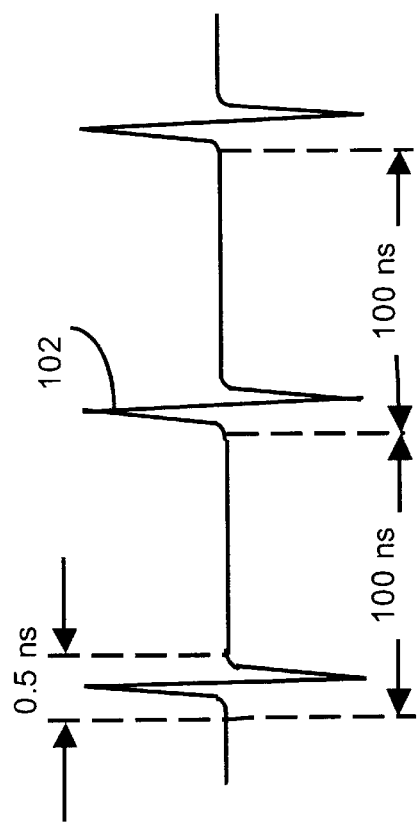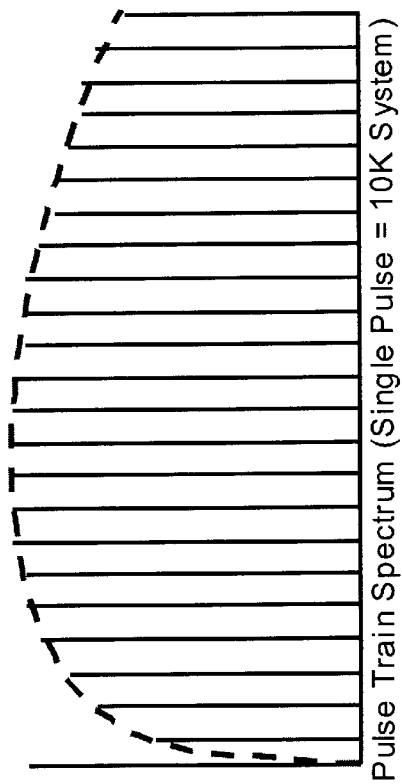

METHOD OF ENVELOPE DETECTION AND IMAGE GENERATION

CROSS REFERENCE TO RELATED APPLICATIONS

This Application claims priority of U.S. Provisional Application Ser. No. 60/271,499, filed Feb. 26, 2001, which is incorporated by reference herein.

BACKGROUND

Law enforcement agencies often are confronted with hostage situations where armed intruders are barricaded inside a building. Officers on the scene generally have no means for determining the number and position of persons within the building, and are thus hampered in their efforts to resolve the situation. Similarly, law enforcement personnel planning a surprise raid on an armed compound would also greatly benefit from information related to the number and position of persons within. Such situational awareness decreases the amount of risk faced by the entering law enforcement personnel by decreasing the amount of unknowns. Furthermore, such a system would be of great use to rescue agency attempting to find survivors in cave-ins or collapsed buildings.

Prior attempts to provide law enforcement and rescue personnel with a priori knowledge of the occupants of a structure include acoustic, optical and infra-red (IR) detection systems. The acoustic solution is simply to have a very sensitive listening device (i.e. microphone), or array of them, and listen to determine if there were any noises coming from the room. However, without an array of directional devices, it is impossible to determine the location of the targets generating the sound. Furthermore, moving targets may not make enough sound to be detected.

The optical solution is to somehow, view the interior of the structure through a window, or to find a crack in the structure through which to view the interior, or actually drill a hole so that a camera of some sort could be inserted and the room surveilled. The drawbacks of this solution are that it takes time to find a crack or drill a hole and it is noisy to do so. Thus, in a hostage or raid situation, the law enforcement personnel could lose the tactical advantage of surprise by virtue of lack of stealth. Additionally, view through a window or crack may only provide a limited field of view, and so, parts of the room may be hidden. Moreover, if the room is smoke filled then this solution is ineffective. Finally, the IR solution is basically a thermal mapping solution. However this cannot be implemented as a through wall device, one must have a direct view of the room. Furthermore, for obvious reasons IR devices are rendered ineffective in fire-fighting scenarios.

On the other hand, ultra wideband (UWB) radars exhibit many desirable features that would be advantageous in those sorts of environments, such as high range resolution, low processing sidelobes, excellent clutter rejection capability, and the ability to scan distinct range windows. Additionally, the technique of time modulated UWB (TM-UWB) adds decreased range ambiguities and increased resistance to spoofing or interference. Impulse radar can operate on wavelengths capable of penetrating typical non-metallic construction material. These advantages make impulse radar particularly beneficial in short range, high clutter environments. Thus, impulse radars have beneficial applicability in environments where vision is obscured by obstacles such as walls, rubble, or smoke, and fire. Various embodiments of impulse radar have been described in co-owned U.S. Pat. Nos. 4,743,906, issued to Fullerton, May 10, 1988; 4,813,057, issued to Fullerton, Mar. 14, 1989; and 5,363,108, issued to Fullerton, Nov. 8, 1994, all of which are incorporated herein by reference. Moreover, arrays of such radars have been developed for such uses as high resolution detection and intruder alert systems, as described in co-owned U.S. Pat. Nos. 6,218,979B1, issued to Barnes, et al Apr. 17, 2001; and 6,177,903, issued to Fullerton, et al Jan. 23, 2001, respectively, both of which are incorporated herein by reference. These systems benefit from being low-power, non-interfering, and yet capable of scanning through typical, non-metallic building material.

However, as indicated in the described patents, those implementations comprise two or more radar systems making them not easily transportable. The above-described scenarios benefit from ease of transport and stealth. Recent advances in ultra wideband radio technology have enabled the development of radar platforms that allow a single operator to detect and monitor targets through walls, rubble or other material.

A need, therefore, exists for a system that allows detection of moving targets through walls or other non-metallic building material, but capable of transport and operation by one user. Such a system would obviously include the capability to display target information, such as range and azimuth, to the user.

One of the difficulties of developing such devices is associated with the fact the received signals are in alternating current (AC). This means there is not a single maximum that indicates the location of the object or target. This gets even more complicated as the pulses' number of lobes increases. Whether the target in moving near the radar or the radar is moving near the target, a specific range cell will experience nulls that are approximately periodic as the target moves through it even though it is desired to have a continuous detection. For imaging, the AC effects manifest themselves by giving the target has a "beehive" look caused by periodic peaks and troughs in the image. These bands from the target response are distracting and can cause misinterpretation, particularly when multiple targets are present. If an entire time domain waveform has been collected, the envelope of the target's response can be used to eliminate these misleading drops in the signal.

One such method to do this is a square law detector, or an envelope detector using a rectifier followed by a low pass filter. The disadvantage of such a techniques is that they require the system to sample and collect an entire waveform which requires a programmable time delay. Moreover, they introduce signal processing requirements in extremely cost sensitive systems such as proximity detectors. The driving cost requirements make it desirable to minimize the number of range cells used to make a detection decision and to minimize the required calculations. For imaging, such as in back projection techniques, a square law detector can be used along radials from the radar to produce a envelop of the back projected image. However, this can be computational intensive, an extreme problem when trying to perform in real time with inexpensive processors. This type of problem has significantly limited the availability of such radars in the commercial market because the processing requirements render such systems economically infeasible.

Thus, a beneficial method of detection and image processing of UWB radar signals is needed.

SUMMARY OF THE INVENTION

The present invention is directed to a method of detection and imaging in UWB radars that satisfies this need. The method comprises receiving an impulse waveform reflected from an object and creating an envelope by squaring that waveform, then delaying the waveform by a time interval and squaring the delayed waveform, and summing both squares. The interval is equal to the time between the occurrence of the greatest magnitude of energy displacement, either positive or negative, and an adjacent zero energy value. The interval is herein referred to as the "peak-to-zero" interval or the PZD interval. If the envelope is to be defined in terms of voltage, the root of the sum of the squares may be found.

The measurement of the interval may be based upon a permanently stored value derived from factory or pre-use calibration testing. Alternatively, the interval may be determined in real time by measuring the interval from the reflected waveform.

A further embodiment includes the step of storing the reflected waveform, and further storing the reflected waveform by sampling the waveform at a rate less than the Nyquist rate.

A further embodiment of the present invention is beneficially employed in back-projection imaging techniques whereby, in a radar device each of a plurality of waveforms is sampled at a first sampling point. The values of these samples are summed, and this sum is squared. The waveforms are delayed by the PZD interval and samples are taken at corresponding sampling points. These sampling points correspond to image pixels. The values of the samples from the delayed waveforms are likewise summed and squared. The two squared values are added together. Again, if the image envelope, thus defined, is to be represented in terms of voltage, the root of total may be found.

BRIEF DESCRIPTION OF THE DRAWINGS

These and other features, aspects, and advantages of the present invention will become better understood with regard to the following description, appended claims, and accompanying drawings where:

FIG. 1A illustrates a representative Gaussian Monocycle waveform in the time domain;

FIG. 1B illustrates the frequency domain amplitude of the Gaussian Monocycle of FIG. 1A;

FIG. 1C represents the second derivative of the Gaussian Monocycle of FIG. 1A;

FIG. 1D represents the third derivative of the Gaussian Monocycle of FIG. 1A;

FIG. 2A illustrates a pulse train comprising pulses as in FIG. 1A;

FIG. 2B illustrates the frequency domain amplitude of the waveform of FIG. 2A;

FIG. 2C illustrates the pulse train spectrum;

FIG. 2D is a plot of the Frequency vs. Energy Plot and points out the coded signal energy spikes;

DETAILED DESCRIPTION OF THE PRESENT INVENTION

Figure 1E:
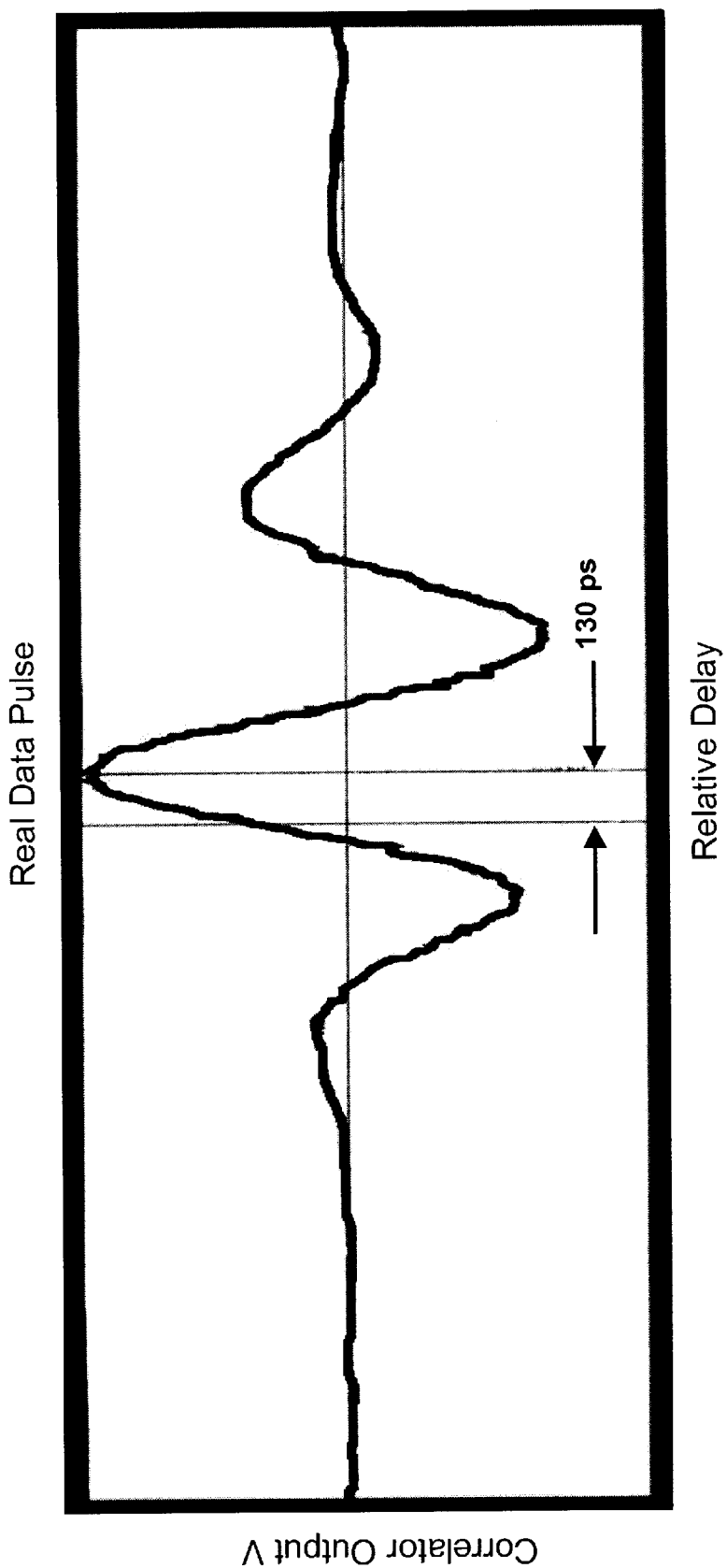
FIG. 1E represents the Correlator Output vs. the Relative Delay in a real data pulse.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

1. Ultra Wideband/Impulse Radars

Recent advances in radio frequency technology have enabled ultra wideband technology (UWB) or impulse radio systems To better understand the benefits of impulse radio to the present invention, the following review of impulse radio follows. Impulse radio has been described in a series of patents, including U.S. Pat. Nos. 4,641,317 (issued Feb. 3, 1987), 4,813,057 (issued Mar. 14, 1989), 4,979,186 (issued Dec. 18, 1990) and 5,363,108 (issued Nov. 8, 1994) to Larry W. Fullerton. A second generation of impulse radio patents includes U.S. Pat. Nos. 5,677,927 (issued Oct. 14, 1997), 5,687,169 (issued Nov. 11, 1997), 5,764,696 (issued Jun. 9, 1998), and 5,832,035 (issued Nov. 3, 1998) to Fullerton et al. All of the above listed patents are incorporated by reference herein.

It should be understood that the terminology 'impulse radio' is used primarily for historical convenience and that the terminology can be generally interchanged with the terminology 'impulse system, ultra-wideband system, or ultra-wideband communication systems'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, low duty-cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Impulse radio can use many types of modulation, including amplitude modulation, phase modulation, frequency modulation, time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio, inter-pulse spacing may be held constant or may be varied on a pulse-by-pulse basis by information, a code, or both. In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Impulse transmission systems are based on short, low duty-cycle pulses. Different pulse waveforms, or pulse types, may be employed to accommodate requirements of various applications. Typical pulse types include a Gaussian pulse, pulse doublet (also referred to as a Gaussian monocycle), pulse triplet, and pulse quadlet as depicted in FIGS. 1A through 1D, respectively. An actual received waveform that closely resembles the theoretical pulse quadlet is shown in FIG. 1E. A pulse type may also be a wavelet set produced by combining two or more pulse waveforms (e.g., a doublet/triplet wavelet set). These different pulse types may be produced by methods described in the patent documents referenced above or by other methods, as persons skilled in the art would understand.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where σ is a time scaling parameter, t is time, and e is the natural logarithm base.

Figure 1F:
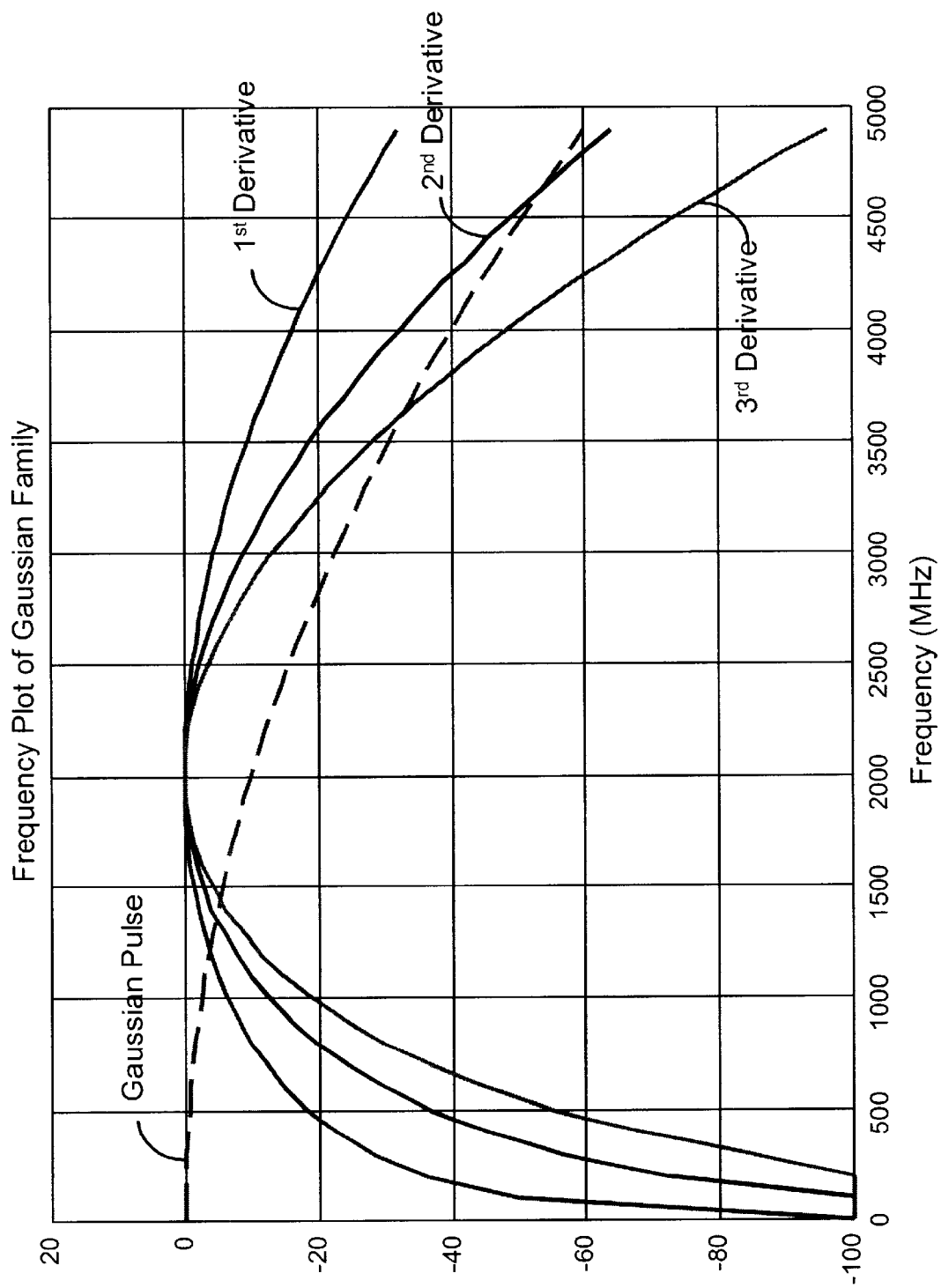
FIG. 1F depicts the frequency plot of the Gaussian family of the Gaussian Pulse and the first, second, and third derivative.

The power special density of the Gaussian monocycle is shown in FIG. 1F, along with spectrums for the Gaussian pulse, triplet, and quadlet. The corresponding equation for the Gaussian monocycle is:

$$F_{mono}(f) = (2\pi)^{\frac{3}{2}}\sigma f e^{-2(\pi\sigma f)^2}$$

The center frequency ($f_c$), or frequency of peak spectral density, of the Gaussian monocycle is:

$$f_c = \frac{1}{2\pi\sigma}$$

It should be noted that the output of an ultra-wideband antenna is essentially equal to the derivative of its input Accordingly, since the pulse doublet, pulse triplet, and pulse quadlet are the first, second, and third derivatives of the Gaussian pulse, in an ideal model, an antenna receiving a Gaussian pulse will transmit a Gaussian monocycle and an antenna receiving a Gaussian monocycle will provide a pulse triplet.

Coding

Impulse transmission systems may communicate one or more data bits with a single pulse; however, typically each data bit is communicated using a sequence of pulses, known as a pulse train. As described in detail in the following example system, the impulse transmitter produces and outputs a train of pulses. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems typically have very low average duty cycles, resulting in average power lower than peak power.

The duty cycle of the signal in FIG. 2A is 0.5%, based on a 0.5 ns pulse duration in a 100 ns interval.

The signal of an uncoded, unmodulated pulse train may be expressed:

$$s(t) = (-1)^f a \sum_j \omega(ct - jT_f, b)$$

where j is the index of a pulse within a pulse train, $(-1)^f$ is polarity (+/−), a is pulse amplitude, b is pulse type, c is pulse width, $\omega(t, b)$ is the normalized pulse waveform, and $T_f$ is pulse repetition time, The energy spectrum of a pulse train signal over a frequency bandwidth of interest may be determined by summing the phasors of the pulses at each frequency, using the following equation:

$$A(\omega) = \left| \sum_{i=1}^{n} \frac{e^{j\Delta t}}{n} \right|$$

where $A(\omega)$ is the amplitude of the spectral response at a given frequency, $\omega$ is the frequency being analyzed ($2\pi f$), $\Delta t$ is the relative time delay of each pulse from the start of time period, and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Specialized coding techniques can be employed to specify temporal and/or non-temporal pulse characteristics to produce a pulse train having certain spectral and/or correlation properties. For example, by employing a PN code to vary inter-pulse spacing, the energy in the comb lines presented in FIG. 2B can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses). Coding provides a method of establishing independent transmission channels. Specifically, families of codes can be designed such that the number of pulse coincidences between pulse trains produced by any two codes will be minimal. Generally, keeping the number of pulse collisions minimal represents a substantial attenuation of the unwanted signal.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specie a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

Reception and Demodulation

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they do not depend on receiving every transmitted pulse. Impulse radio receivers perform a correlating, synchronous receiving function (at the RF level) that uses statistical sampling and combining, or integration, of many pulses to recover transmitted information. Typically, 1 to 1000 or more pulses are integrated to yield a single data bit thus diminishing the impact of individual pulse collisions, where the number of pulses that must be integrated to successfully recover transmitted information depends on a number of variables including pulse rate, bit rate, range and interference levels.

Besides providing channelization and energy smoothing, coding makes impulse systems highly resistant to interference and jamming or spoofing by enabling discrimination between intended impulse transmissions and interfering transmissions. This property is desirable since impulse systems must share the energy spectrum with conventional radio systems and with other impulse systems.

Figure 3A:
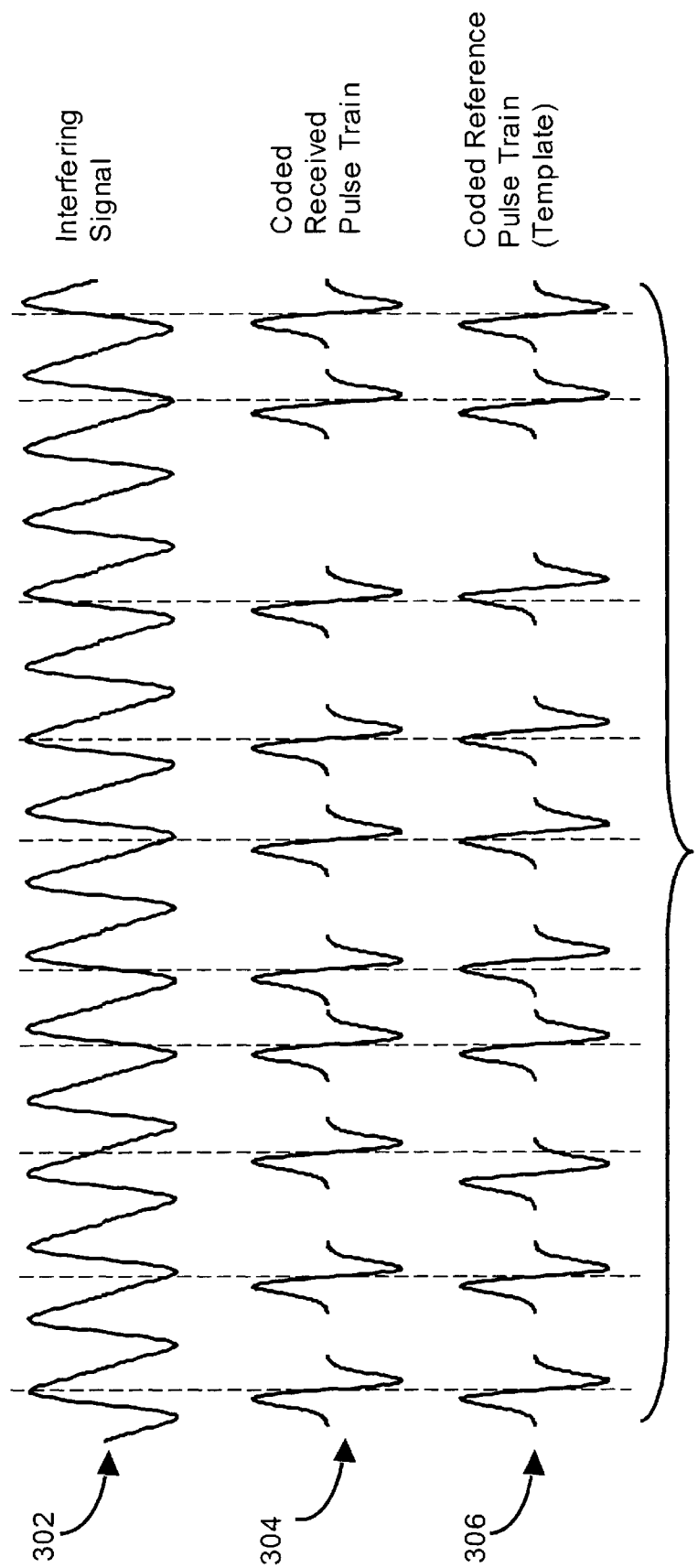
FIG. 3A illustrates representative signals of an interfering signal, a coded received pulse train and a coded reference pulse train.

FIG. 3A illustrates the result of a narrow band sinusoidal interference signal 302 overlaying an impulse radio signal 304. At the impulse radio receiver, the input to the cross correlation would include the narrow band signal 302 and the received ultrawide-band impulse radio signal 304. The input is sampled by a correlator using a template signal 306 positioned in accordance with a code. Without coding, the correlation would sample the interfering signal 302 with such regularity that the interfering signals could cause interference to the impulse radio receiver. However, when the transmitted impulse signal is coded and the impulse radio receiver template signal 306 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a direct sequence spread spectrum system with a 10 KHz information bandwidth and a 10 MHz channel bandwidth yields a processing gain of 1000, or 30 dB. However, far greater processing gains are achieved by impulse radio systems, where the same 10 KHz information bandwidth is spread across a much greater 2 GHz channel bandwidth, resulting in a theoretical processing gain of 200,000, or 53 dB.

Capacity

It can be shown theoretically, using signal-to-noise arguments, that thousands of simultaneous channels are available to an impulse radio system as a result of its exceptional processing gain.

The average output signal-to-noise ratio of the impulse radio may be calculated for randomly selected time-hopping codes as a function of the number of active users, $N_u$, as:

$$SNR_{out}(N_u) = \frac{(N_s A_1 m_p)^2}{\sigma_{rec}^2 + N_s \sigma_a^2 \sum_{k=2}^{N_u} A_k^2}$$

where $N_s$ is the number of pulses integrated per bit of information, $A_k$ models the attenuation of transmitter k's signal over the propagation path to the receiver, and $\sigma_{rec}^2$ is the variance of the receiver noise component at the pulse train integrator output. The monocycle waveform-dependent parameters $m_p$ and $\sigma_a^2$ are given by $$m_p = \int_{-\infty}^{\infty} \omega(t)[\omega(t) - \omega(t-\delta)]dt$$

and $$\sigma_a^2 = T_f^{-1} \int_{-\infty}^{\infty} \left[ \int_{-\infty}^{\infty} \omega(t-s)v(t)dt \right]^2 ds,$$

where $\omega(t)$ is the monocycle waveform, $v(t)=\omega(t)-\omega(t-\delta)$ is the template signal waveform, $\delta$ is the time shift between the monocycle waveform and the template signal waveform, $T_f$ is the pulse repetition time, and s is signal.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents the majority of the potential coverage area of a radio system. In a mobile system, received signal strength fluctuates due to the changing mix of multipath signals that vary as its position varies relative to fixed transmitters, mobile transmitters and signal-reflecting surfaces in the environment.

Figures 3B, 3C:
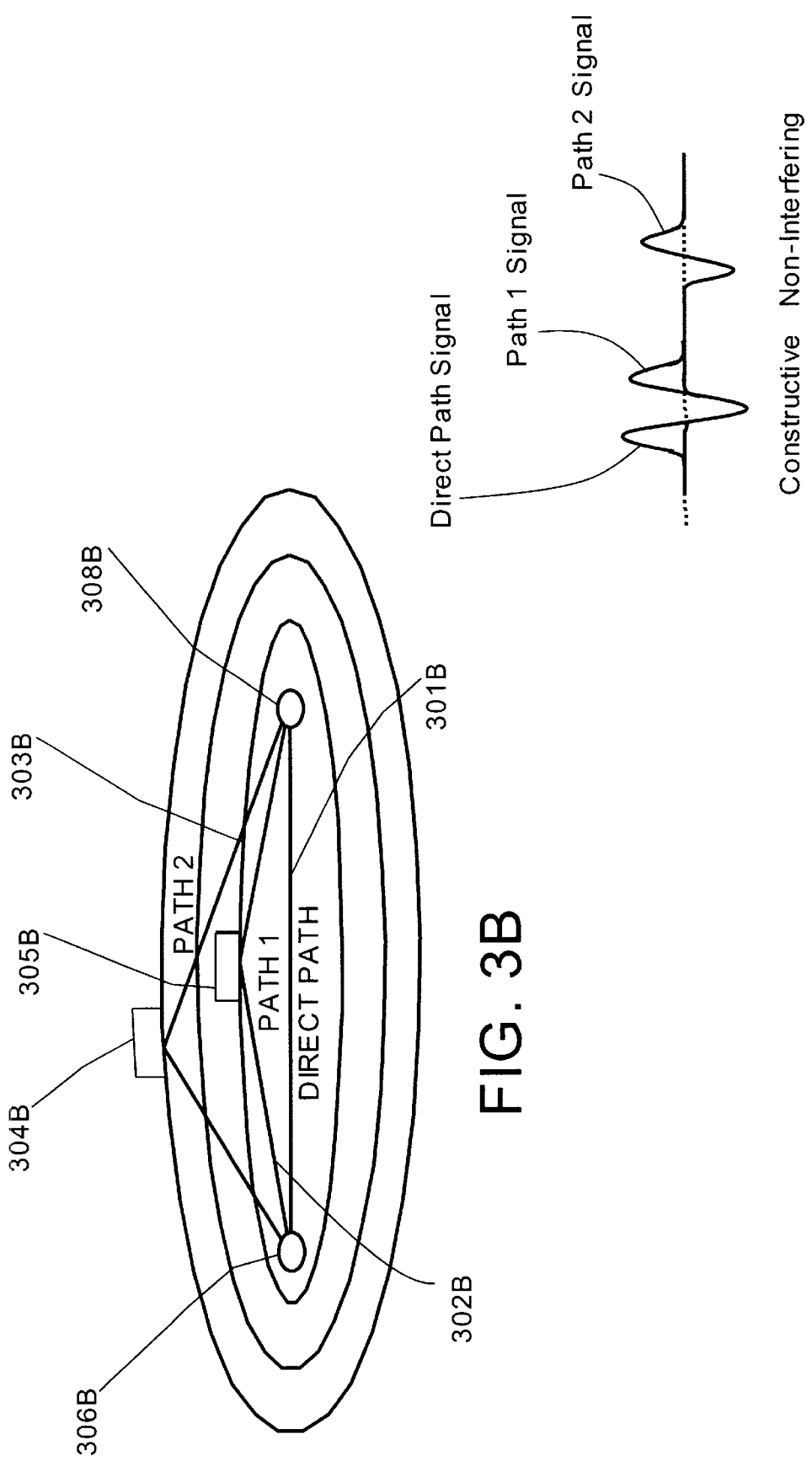
FIG. 3B depicts a typical geometrical configuration giving rise to multipath received signals.
FIG. 3C illustrates exemplary multipath signals in the time domain.

Impulse radios, however, can be substantially resistant to multipath effects. Impulses arriving from delayed multipath reflections typically arrive outside of the correlation time and, thus, may be ignored. This process is described in detail with reference to FIGS. 3B and 3C. FIG. 3B illustrates a typical multipath situation, such as in a building, where there are many reflectors 304B, 305B. In this figure, a transmitter 306B transmits a signal that propagates along three paths, the direct path 301B, path 1 302B, and path 2 303B, to a receiver 308B, where the multiple reflected signals are combined at the antenna. The direct path 301B, representing the straight-line distance between the transmitter and receiver, is the shortest. Path 1 302B represents a multipath reflection with a distance very close to that of the direct path. Path 2 303B represents a multipath reflection with a much longer distance. Also shown are elliptical (or, in space, ellipsoidal) traces that represent other possible locations for reflectors that would produce paths having the same distance and thus the same time delay.

FIG. 3C illustrates the received composite pulse waveform resulting from the three propagation paths 301B, 302B, and 303B shown in FIG. 3B. In this figure, the direct path signal 301B is shown as the first pulse signal received. The path 1 and path 2 signals 302B, 303B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

Figure 3D:
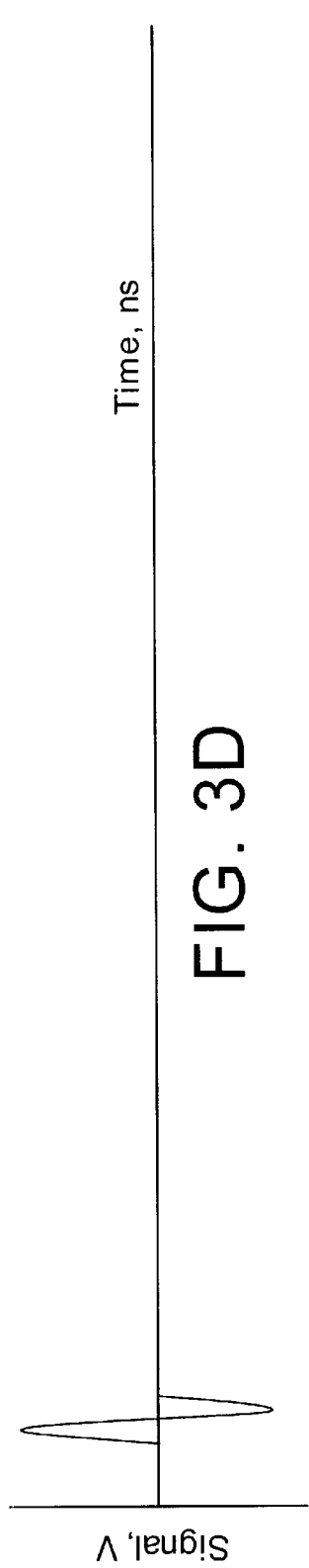
FIGS. 3D–3F illustrate a signal plot of various multipath environments.
Figure 3E:
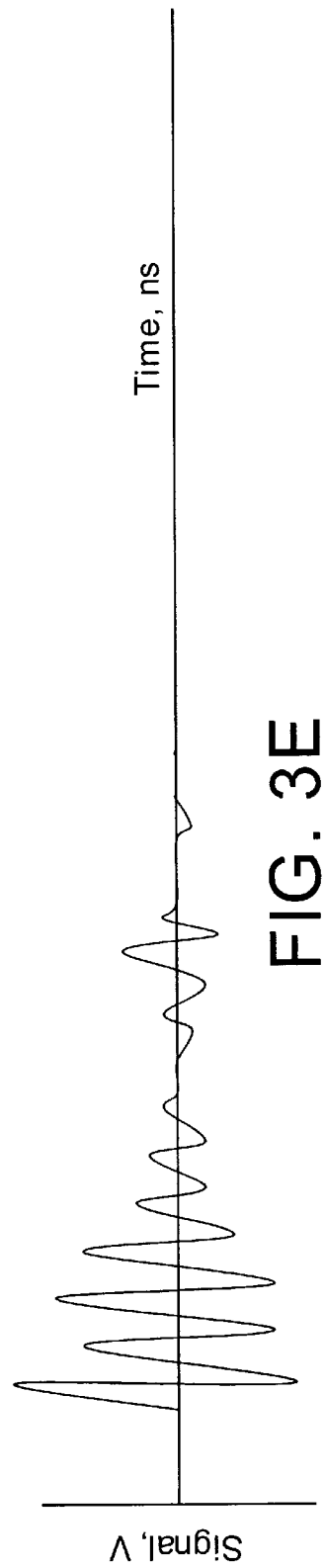
Figure 3F:
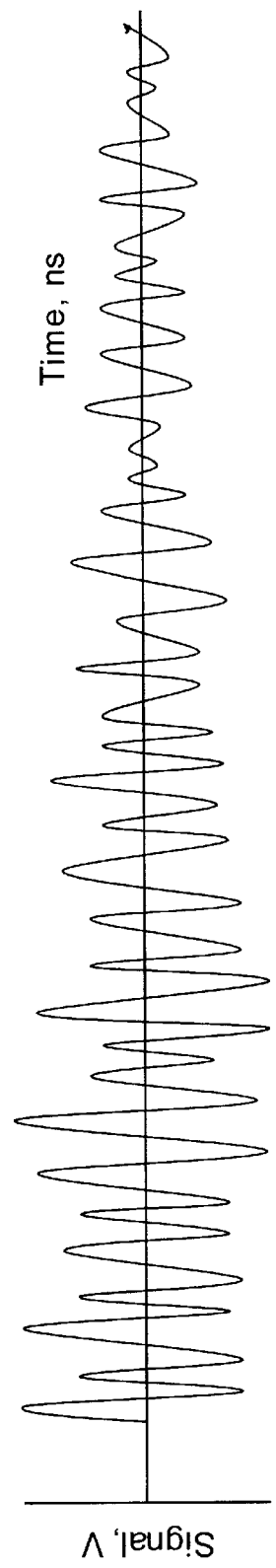

FIGS. 3D, 3E, and 3F represent the received signal from a TM-UWB transmitter in three different multipath environments. These figures are approximations of typical signal plots. FIG. 3D illustrates the received signal in a very low multipath environment This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 3E illustrates an intermediate multipath environment. This approximates the response from one room to the next in a building. The amplitude of the direct path signal is less than in FIG. 3D and several reflected signals are of significant amplitude. FIG. 3F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 3E. In this situation, the direct path signal power is small relative to the total signal power from the reflections.

Figure 3G:
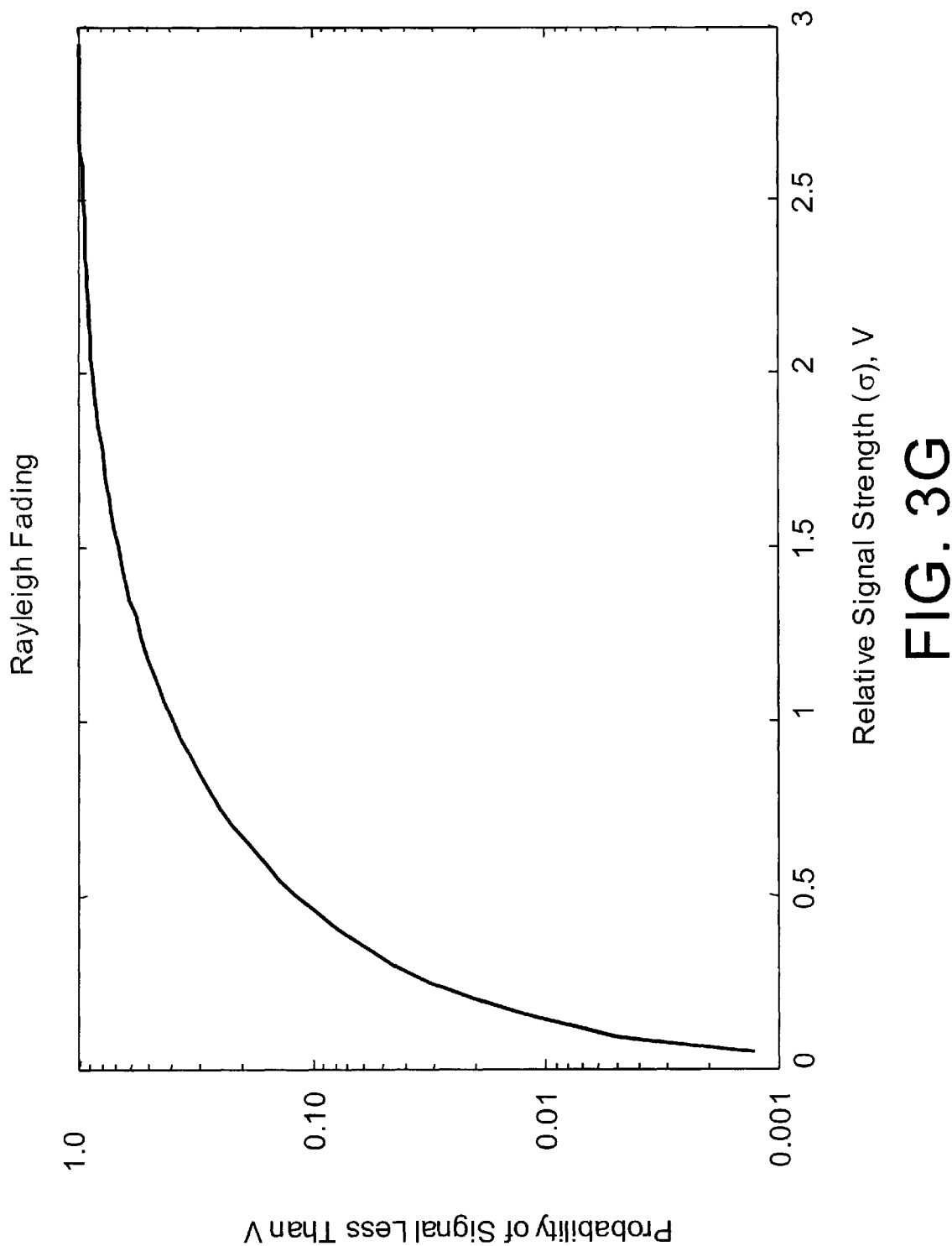
FIG. 3G illustrates the Rayleigh fading curve associated with non-impulse radio transmissions in a multipath environment.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Where the system of FIG. 3B is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sigma(2)^{1/2}$ is the RMS power of the combined multipath signals. The Rayleigh distribution curve in FIG. 3G shows that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 3H:
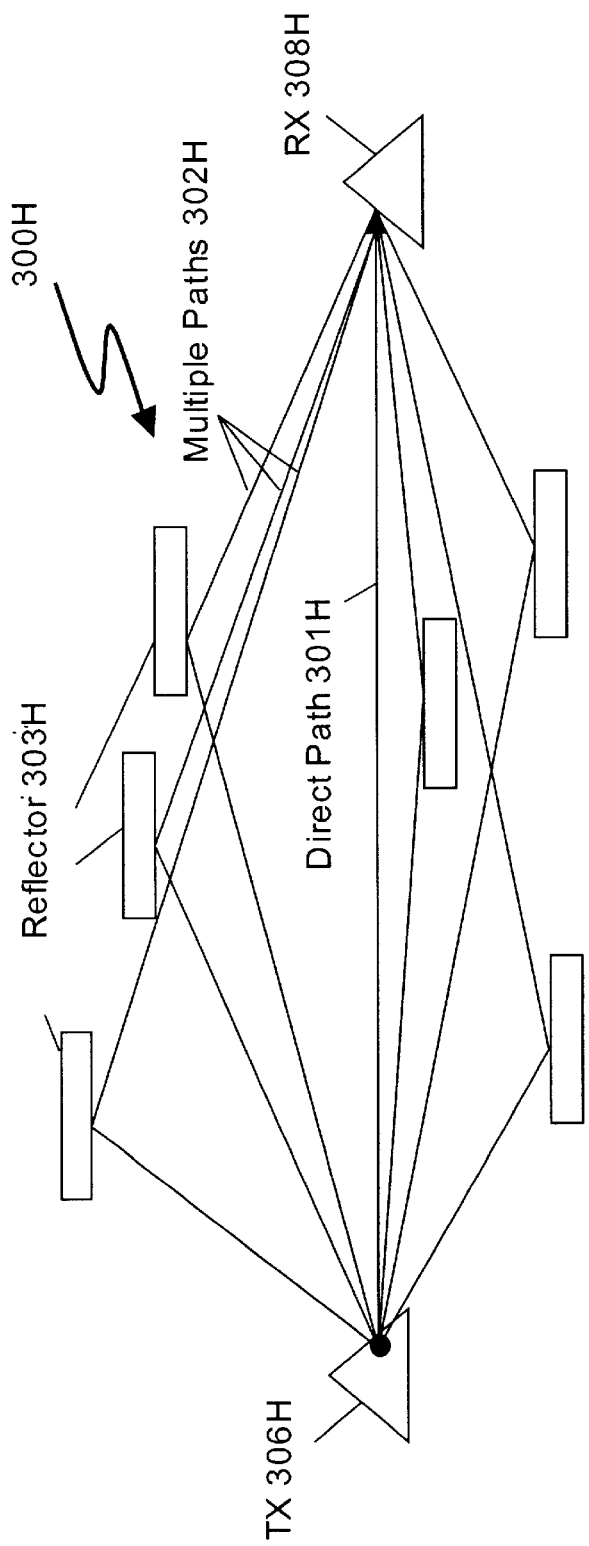
FIG. 3H illustrates a plurality of multipaths with a plurality of reflectors from a transmitter to a receiver.
Figure 3I:
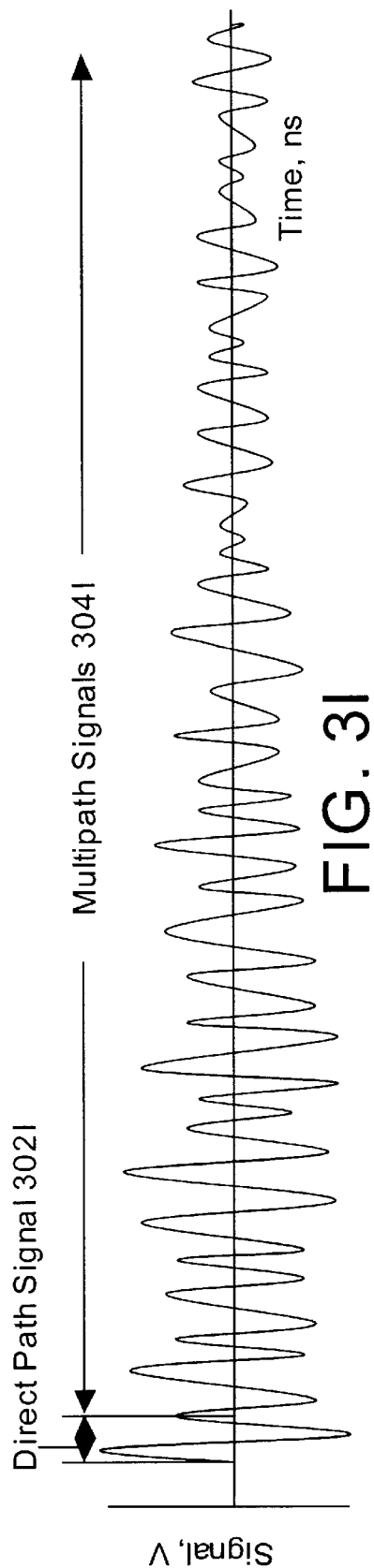
FIG. 3I graphically represents signal strength as volts vs. time in a direct path and multipath environment.

In a high multipath environment such as inside homes, offices, warehouses, automobiles, trailers, shipping containers, or outside in an urban canyon or other situations where the propagation is such that the received signal is primarily scattered energy, impulse radio systems can avoid the Rayleigh fading mechanism that limits performance of narrow band systems, as illustrated in FIGS. 3H and 3I. FIG. 3H depicts an impulse radio system in a high multipath environment 300H consisting of a transmitter 306H and a receiver 308H. A transmitted signal follows a direct path 301H and reflects off reflectors 303H via multiple paths 302H. FIG. 3I illustrates the combined signal received by the receiver 308H over time with the vertical axis being signal strength in volts and the horizontal axis representing time in nanoseconds. The direct path 301H results in the direct path signal 302I while the multiple paths 302H result in multipath signals 304I. In the same manner described earlier for FIGS. 3B and 3C, the direct path signal 302I is sampled, while the multipath signals 304I are not, resulting in Rayleigh fading avoidance.

Exemplary Transceiver Implementation

Transmitter

Figures 4, 5:
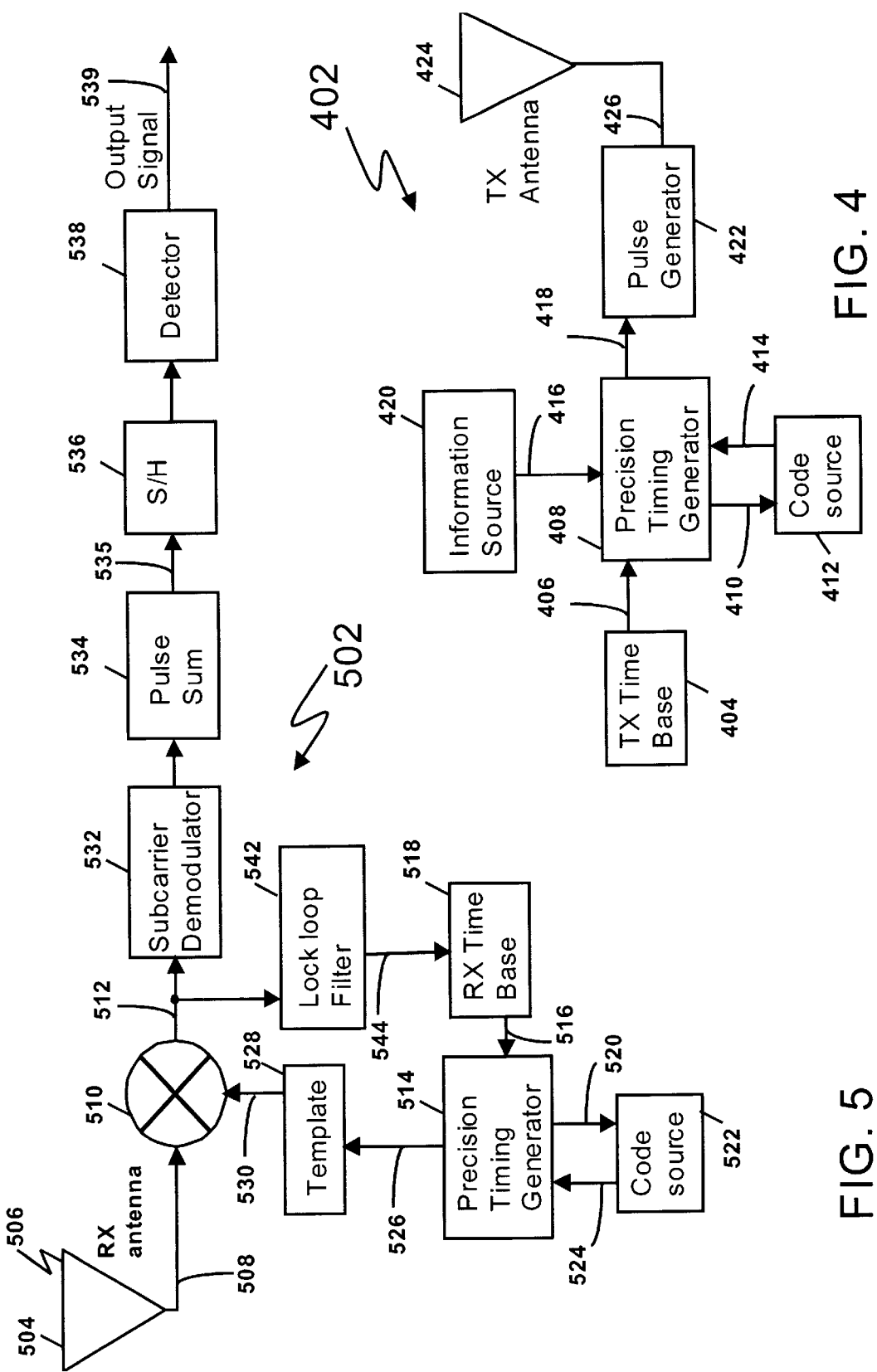
FIG. 4 illustrates a representative impulse radio transmitter functional diagram.
FIG. 5 illustrates a representative impulse radio receiver functional diagram.

An exemplary embodiment of an impulse radio transmitter 402 of an impulse radio communication system having an optional subcarrier channel will now be described with reference to FIG. 4.

The transmitter 402 comprises a time base 404 that generates a periodic timing signal 406. The time base 404 typically comprises a voltage controlled oscillator (VCO), or the like, having a high timing accuracy and low jitter, on the order of picoseconds (ps). The control voltage to adjust the VCO center frequency is set at calibration to the desired center frequency used to define the transmitters nominal pulse repetition rate. The periodic timing signal 406 is supplied to a precision timing generator 408.

The precision timing generator 408 supplies synchronizing signals 410 to the code source 412 and utilizes the code source output 414, together with an optional, internally generated subcarrier signal, and an information signal 416, to generate a modulated, coded timing signal 418.

An information source 420 supplies the information signal 416 to the precision timing generator 408. The information signal 416 can be any type of intelligence, including digital bits representing voice, data, imagery, or the like, analog signals, or complex signals.

A pulse generator 422 uses the modulated, coded timing signal 418 as a trigger signal to generate output pulses. The output pulses are provided to a transmit antenna 424 via a transmission line 426 coupled thereto. The output pulses are converted into propagating electromagnetic pulses by the transmit antenna 424. The electromagnetic pulses are called the emitted signal, and propagate to an impulse radio receiver 502, such as shown in FIG. 5, through a propagation medium. In a preferred embodiment, the emitted signal is wide-band or ultra wideband, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

An exemplary embodiment of an impulse radio receiver (hereinafter called the receiver) for the impulse radio communication system is now described with reference to FIG. 5.

The receiver 502 comprises a receive antenna 504 for receiving a propagated impulse radio signal 506. A received signal 508 is input to a cross correlator or sampler 510, via a receiver transmission line, coupled to the receive antenna 504. The cross correlation 510 produces a baseband output 512.

The receiver 502 also includes a precision timing generator 514, which receives a periodic timing signal 516 from a receiver time base 518. This time base 518 may be adjustable and controllable in time, frequency, or phase, as required by the lock loop in order to lock on the received signal 508. The precision timing generator 514 provides synchronizing signals 520 to the code source 522 and receives a code control signal 524 from the code source 522. The precision timing generator 514 utilizes the periodic timing signal 516 and code control signal 524 to produce a coded timing signal 526. The template generator 528 is triggered by this coded timing signal 526 and produces a train of template signal pulses 530 ideally having waveforms substantially equivalent to each pulse of the received signal 508. The code for receiving a given signal is the same code utilized by the originating transmitter to generate the propagated signal. Thus, the timing of the template pulse train matches the timing of the received signal pulse train, allowing the received signal 508 to be synchronously sampled in the correlator 510. The correlator 510 preferably comprises a multiplier followed by a short term integrator to sum the multiplier product over the pulse interval.

The output of the correlator 510 is coupled to a subcarrier demodulator 532, which demodulates the subcarrier information signal from the optional subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 534. A digital system embodiment is shown in FIG. 5. In this digital system, a sample and hold 536 samples the output 535 of the pulse summation stage 534 synchronously with the completion of the summation of a digital bit or symbol. The output of sample and hold 536 is then compared with a nominal zero (or reference) signal output in a detector stage 538 to provide an output signal 539 representing the digital state of the output voltage of sample and hold 536.

The baseband signal 512 is also input to a lowpass filter 542 (also referred to as lock loop filter 542). A control loop comprising the lowpass filter 542, time base 518, precision timing generator 514, template generator 528, and correlator 510 is used to generate an error signal 544. The error signal 544 provides adjustments to the adjustable time base 518 to position in time the periodic timing signal 526 in relation to the position of the received signal 508.

In a transceiver embodiment, substantial economy can be achieved by sharing part or all of several of the functions of the transmitter 602 and receiver 502. Some of these include the time base 518, precision timing generator 514, code source 522, antenna 504, and the like.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics. Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Exemplary Radar Device

Figure 6:
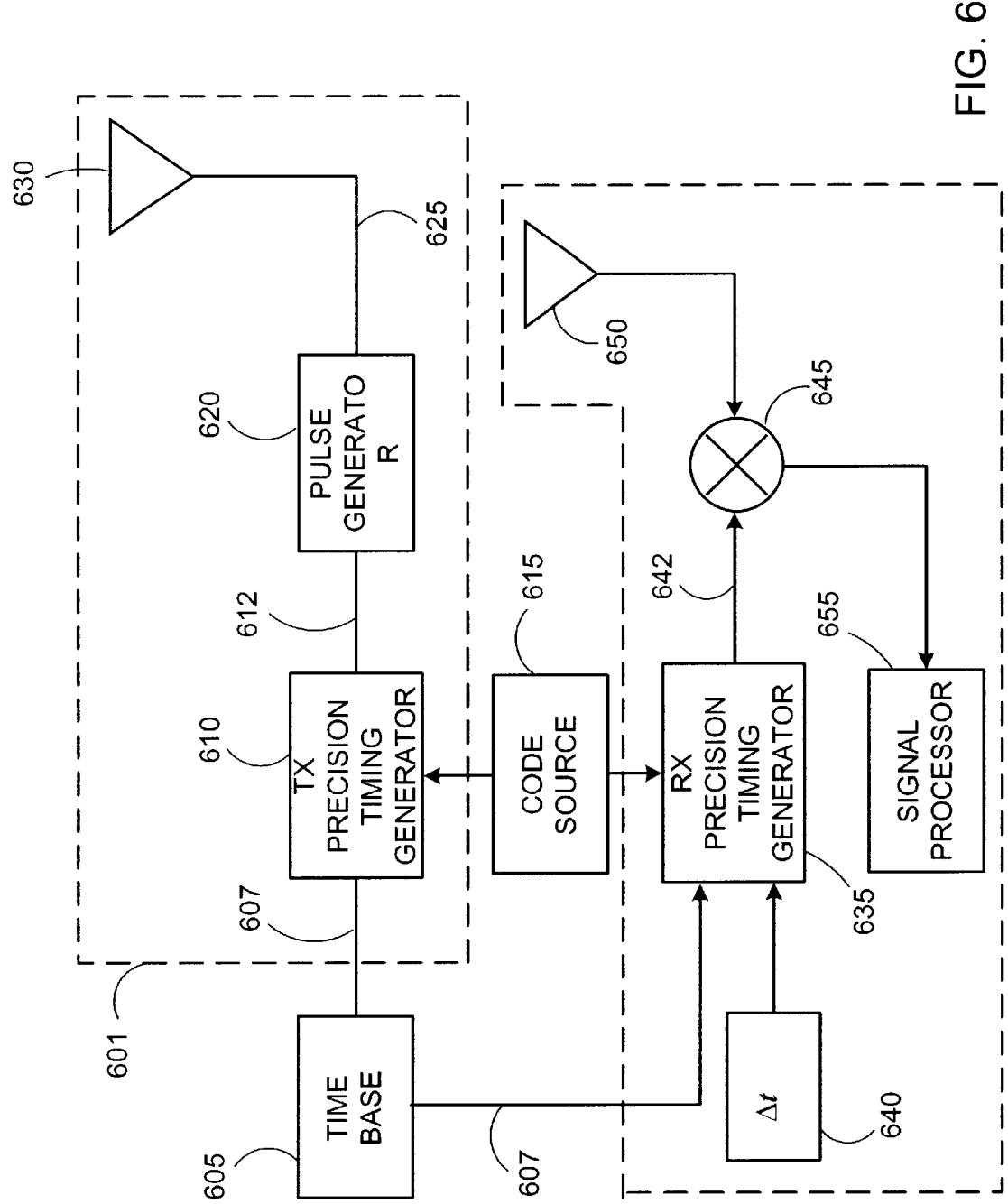
FIG. 6 depicts an exemplary radar device.

With reference to FIG. 6, a transmit component 601 is comprised of a timing base 605 that provides a precise timing signal 607 coupled to a transmitting precision timing generator 610 which positions individual pulses in time in accordance with a signal from a pseudo-noise code source 615. The depicted architecture does not show an information source 420 shown in FIG. 4, however, it should be noted that data could be modulated for transmission in the outgoing signal. The timing generator output 612 is received by a pulse generator 620 which generates the impulse signal 625 that is sent to the transmitting antenna 630 for conversion to an emitted signal.

Inapposite to the exemplary transceiver configurations described with reference to FIGS. 4 and 5, the same timing means provides timing control for the receive component 602 as well. In other words, the same time base 605 is coupled to a receive-side precision timing generator 635 which positions individual sampling pulses in time. The receive-side precision timing generator 635 also receives a signal from the pseudo-noise code source 615. A timing delay 640 is also fed to the receive-side precision timing generator 635 to delay the output some Δt with respect to the transmitted signal in order to develop the necessary ranging information from the return waveforms. This signal 642 is output to a correlator 645, or mixer, or sampler, which samples the signal received from the receiving antenna 650. The result of the correlation step is sent to a signal processor for range and azimuth determination.

2. Impulse Radar Detection and Imaging Using Peak-to-Zero Delay

Figure 7:
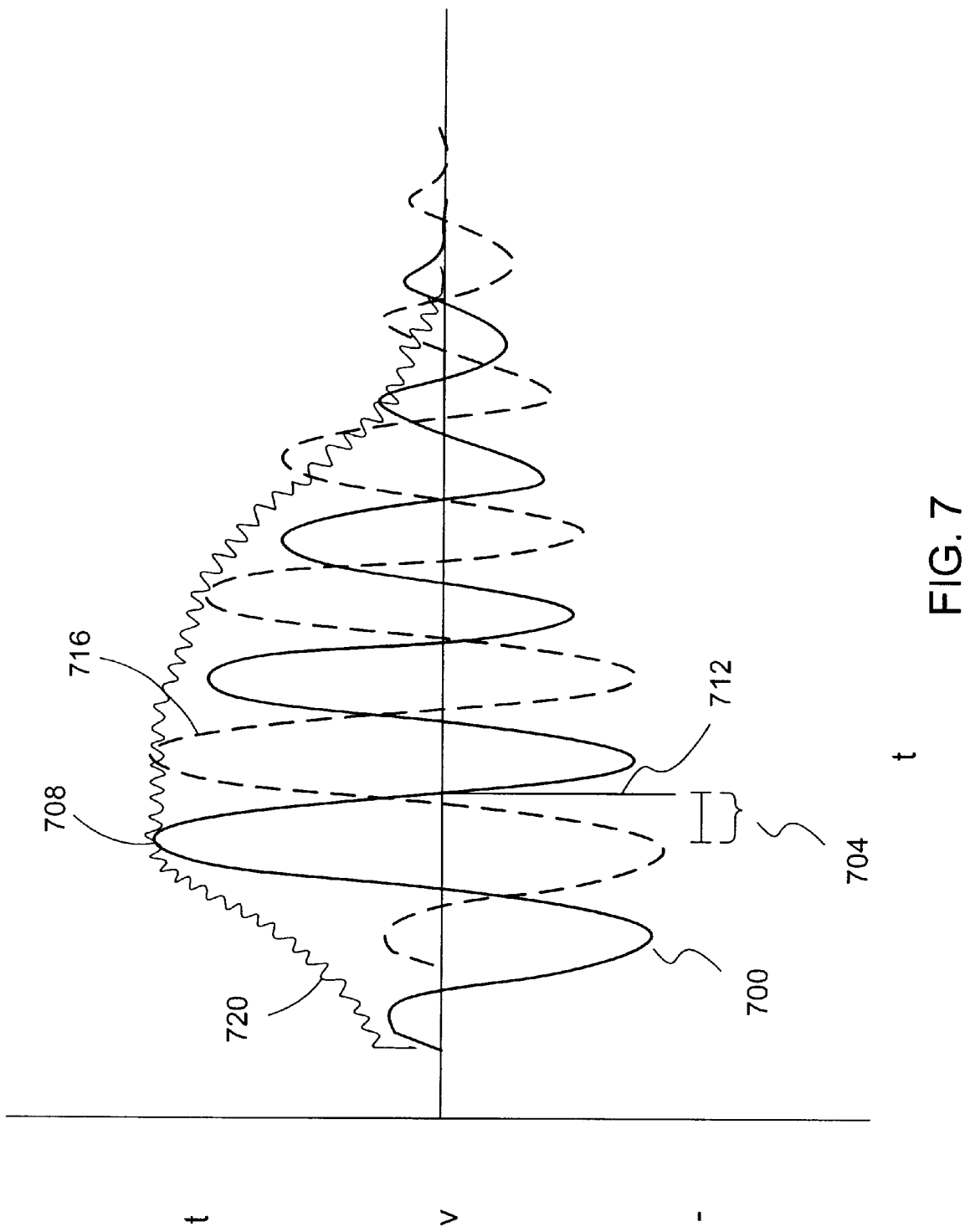
FIG. 7 illustrates the basic method according to the present invention.

FIG. 7 is an exemplary received impulse waveform 700, as the term is used above, such impulse waveform having wideband or ultra-wideband properties. It is observed that for all impulse waveforms the fundamental structure is that of an amplitude modulated sinusoidal wave. The amplitude modulation produces an amplitude envelope 702 which generally approximates a Gaussian function, the temporal duration of which is approximately inversely proportional to the total bandwidth of the impulse waveform 700. Deviations from the ideal Gaussian envelope occur due to the details of the hardware implementation and the spectral shaping requirements of the specific application. However, it is further observed that the sinusoidal component of the impulse waveform 700 has a dominant periodicity which is inversely proportional to the center frequency of the impulse waveform spectrum, said center frequency consisting of a weighted average of the frequency spectrum of the impulse waveform 700.

The present method determines a peak-to-zero delay (PZD) interval 704, by finding the time at which greatest waveform amplitude occurs 708 and the time at which the next-occurring point when the waveform energy is zero 712. The difference between those times is the PZD interval 704. It should be noted that the interval could also be determined using a measurement of the times between a zero-crossing and a peak as well. Likewise, the interval could be measured between a negative displacement with the greatest magnitude and the next-occurring zero-crossing. For simplicity, the term "PZD interval" will mean any of these three values. In the basic method, the received impulse waveform 700 is duplicated and delayed by the PZD interval 704 to make a delayed waveform 716. A detection envelope 720 is then calculated by squaring the received impulse waveform 700 and the PZD delayed waveform 716. These are summed and the square root is taken yielding the definition of the envelope 720.

Often, the ratio of the temporal period corresponding to the center frequency of the ultra-wideband signal 700 divided by the PZD interval 704 is approximately equal to four. For a continuous wave (CW) signal this would correspond to the delay between the in-phase and quadrature (I/Q) components of a sinusoidal signal. However, this analogy can not be used directly in the context of UWB signals for the majority of the band of the UWB signal. True I/Q data is collected by stepped frequency radars or network analyzers that use true sine and cosine waves over the entire band to down convert the RF signal.

Other approaches to performing envelope detection include a low pass filtering method and a Hilbert transform method. The low pass filter method uses square law detection to rectify the received waveform and then applies a low pass filter to remove the high frequency components. The high frequency components are usually associated with the carrier frequency in CW systems. When the carrier is filtered out only the envelope remains. The Hilbert Transform method produces a new waveform from the original waveform which is 90 degrees out of phase with the original waveform. These two waveforms are then combined as described subsequently to form an envelope.

It should be recalled that Nyquist demonstrated that a signal needs to be sampled at a rate twice the highest frequency of interest in order to retain all of the information. This is known in the art as the Nyquist rate. In prior approaches, signal processing works better when the Nyquist rate is exceeded, in other words, when the waveform is over sampled, often by a factor of two to four times the Nyquist rate. Using the PZD method, however, the waveform does not have to be sampled at a rate greater than the Nyquist rate yet the PZD method produces an image free of ambiguous nulls due to AC canceling effects. Thus, processing cost, in terms of capacity, throughput, time and money, is significantly reduced.

Figure 8A:
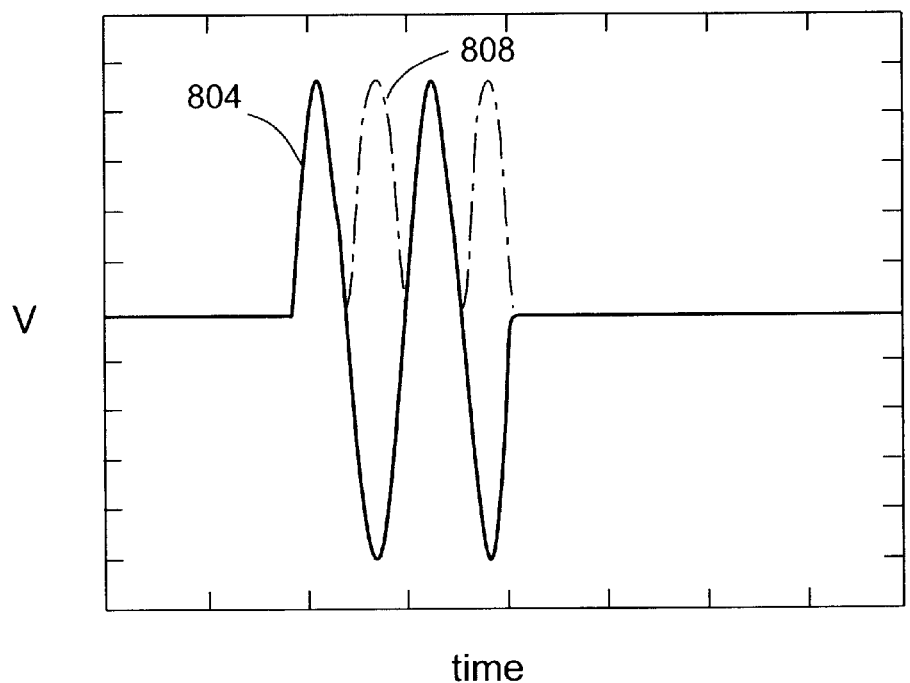
FIG. 8A illustrates a method of using a low-pass filter with a square law rectifying technique known in the prior art, FIG. 8B. illustrates the envelope generated using the technique shown if FIG. 8A
Figure 8B:
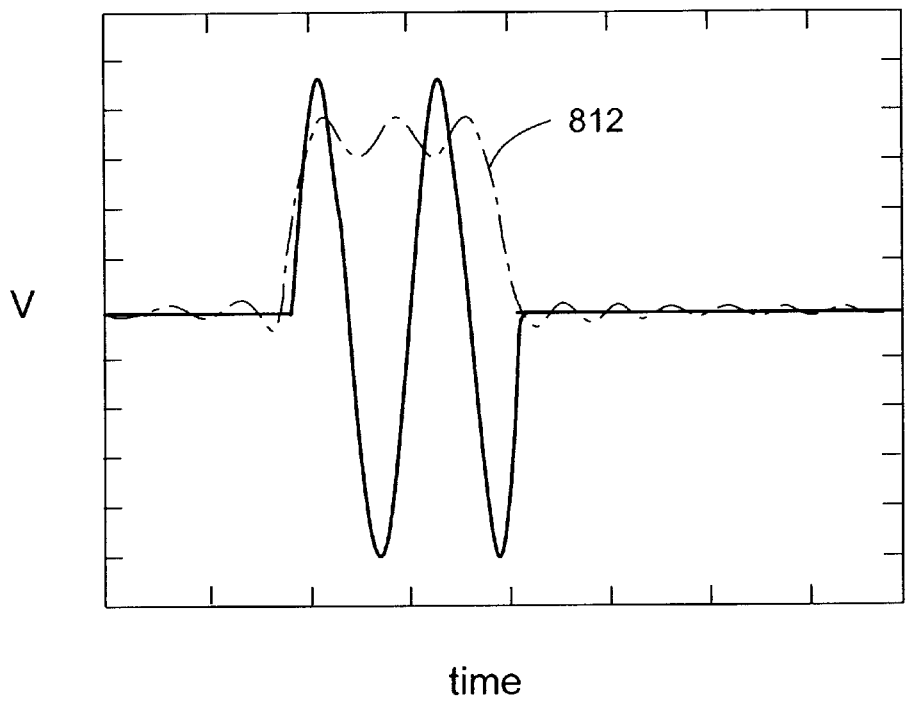
Figure 9A:
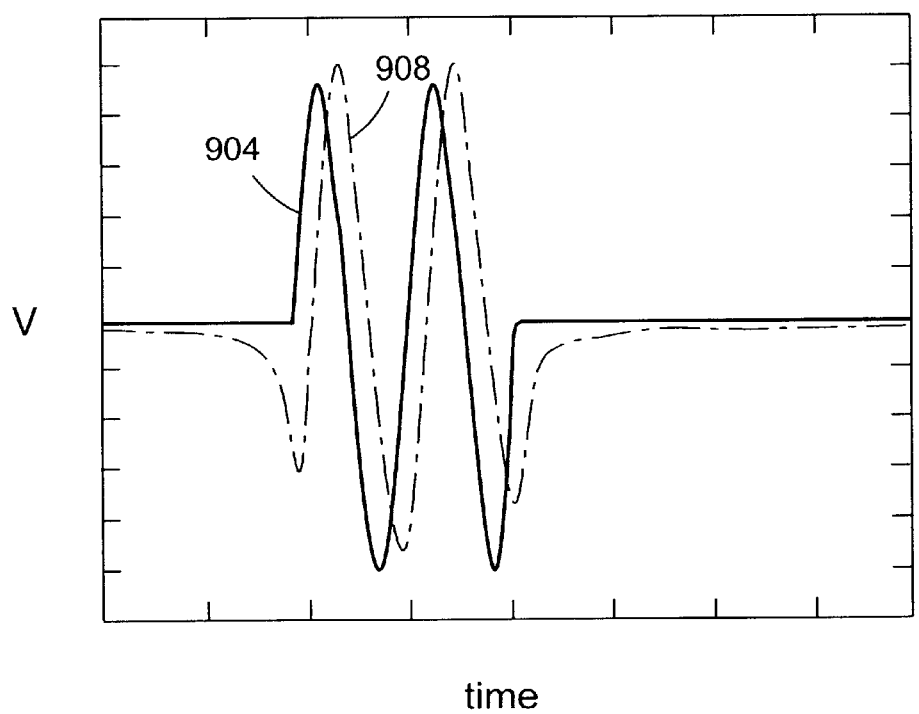
FIG. 9A depicts the use of a Hilbert transform upon the received waveform.
Figure 9B:
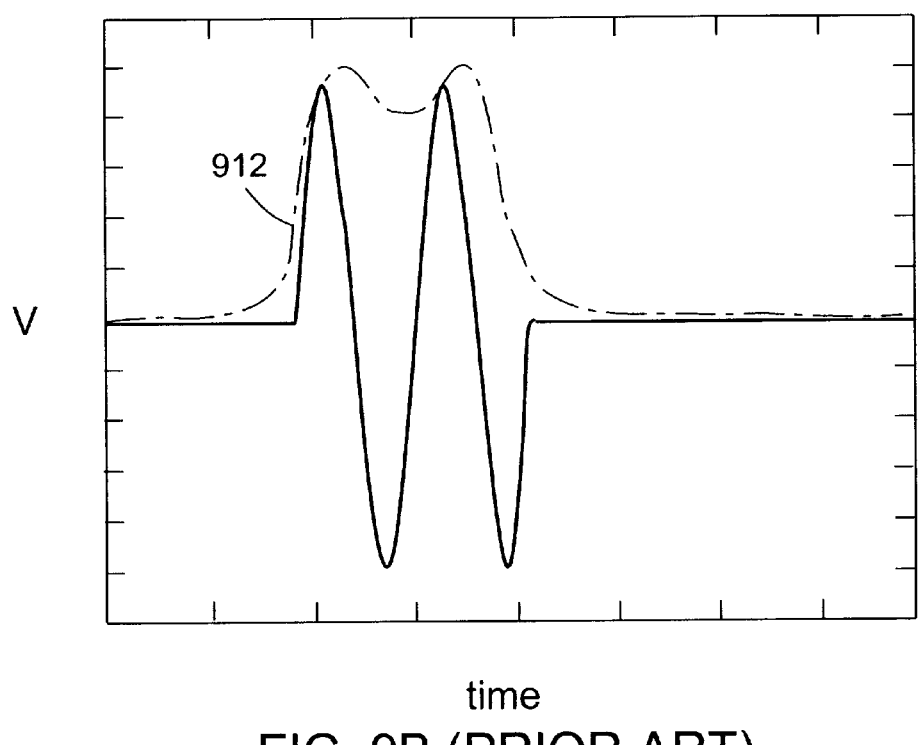
FIG. 9B depicts the envelope generated using the technique shown in FIG. 9A.

To illustrate this point, the envelope of an ideal UWB pulse is generated using three different methods. FIG. 8A depicts a received waveform 804 and a delayed rectified waveform 808 created by rectifying the received waveform 804. In FIG. 8B an envelope 812, is created by applying a low pass filter to the rectified waveform 808. FIG. 9A shows a received waveform 904 paired with its Hilbert transform waveform 908. In FIG. 9B, the envelope 912 of the waveform 904 was created by taking the square root of the sum of the squares of the received waveform 904 and its Hilbert transform 908. In this case, the waveform from the Hilbert transform would be treated just like a delayed waveform. However, this approach requires that the received waveform 904 be sampled at least at the Nyquist rate, requiring a fast receiver sampler, significant processing memory and significant capacity. Moreover, performing the multiple Fourier or Hilbert transformation operations required by either the low pass filter method or the Hilbert method demands much in terms of computational throughput, processing time and capacity.

Figure 10A:
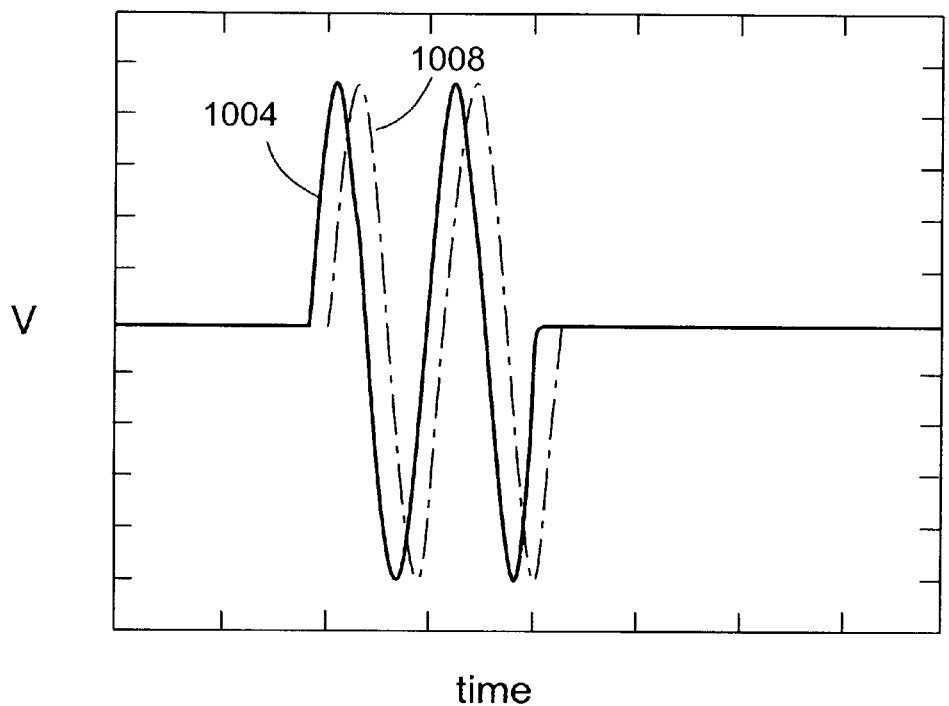
FIG. 10A illustrates the method of delaying the waveform according to the present invention.
Figure 10B:
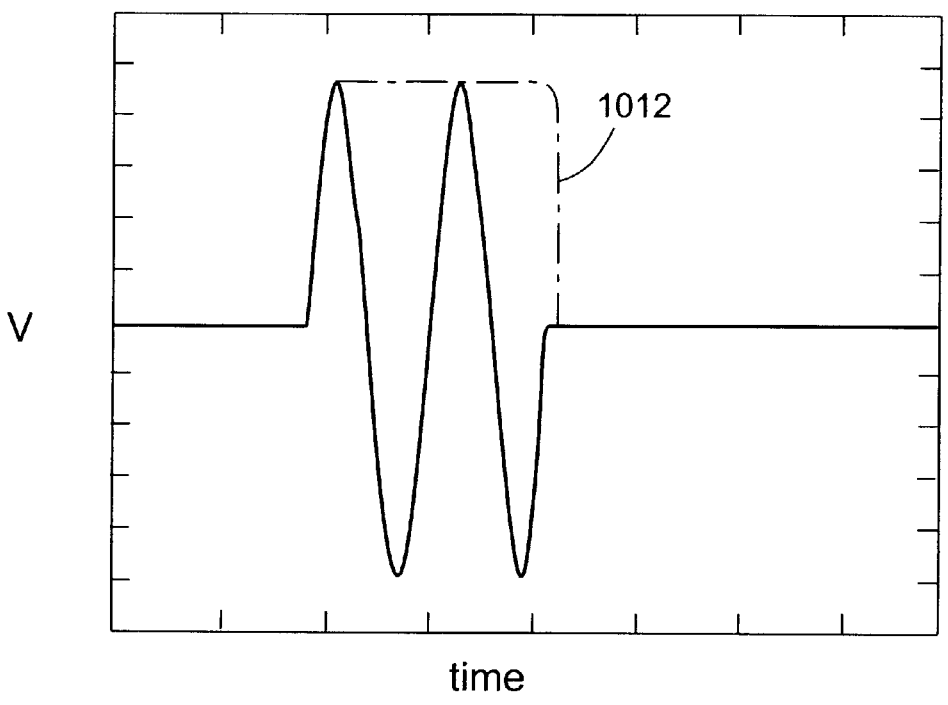
FIG. 10B illustrates the envelope generated according to the present invention.

On the other hand, FIG. 10A shows the raw waveform 1004 and its associated peak-zero delayed waveform 1008. The square root of the sum of the squares of these two waveforms is used to generate the envelope 1012 shown in FIG. 10B. The result using the PZD envelope detection method yields the best results in terms of pulse width and ripple for this ideal pulsed sinusoid example. Note that these results can be achieved without excessive over sampling above the Nyquist rate. In practice, ripples do occur depending upon which lobe in the waveform is being processed because the peak-zero delay interval tends to change slightly across the waveform as a result of frequency dispersion. However, these ripples are usually minor and do not detract from producing an envelope which is highly representative of the true envelope.

It should be noted that the PZD interval method works best when the received impulse waveform 700 is consistent throughout in peak-to-zero distance/time. However, it is more likely that the received waveform 700, when reflected and passing through the propagation media, will suffer irregularities in its shape. Thus, a PZD interval may be chosen by measuring some or all of peak-to-zero and/or zero-to-peak intervals and finding the mean value or a median value of the measured intervals. This, of course, depends upon whether such extra processing is feasible given processing and memory capacity of the apparatus. It may be preferable that if many intervals are measured, a median value is used because of the effects of outlier interval values on the average value. However, decision on whether to select the average value or the median value is dependent upon the magnitude of the standard deviation of the sample.

It should also be noted that in most applications the PZD interval is likely measured in a calibration measurement process and the best performing PZD interval is stored in non-volitile memory and recalled rather than being remeasured each time PZD processing is required in a specific application.

A significant advantage of PZD processing techniques is the ability to sub-sample the data in an image generation process such as Synthetic Aperture Radar (SAR) imaging. In order for existing envelop detection techniques, such as the square law detector, to work properly in a two dimensional image array, the image would need to have a sample spacing on the order of the Nyquist frequency in both dimensions of a uniform resolution image. By using the PZD approach, the required image array can be much smaller in many instances.

Figure 11:
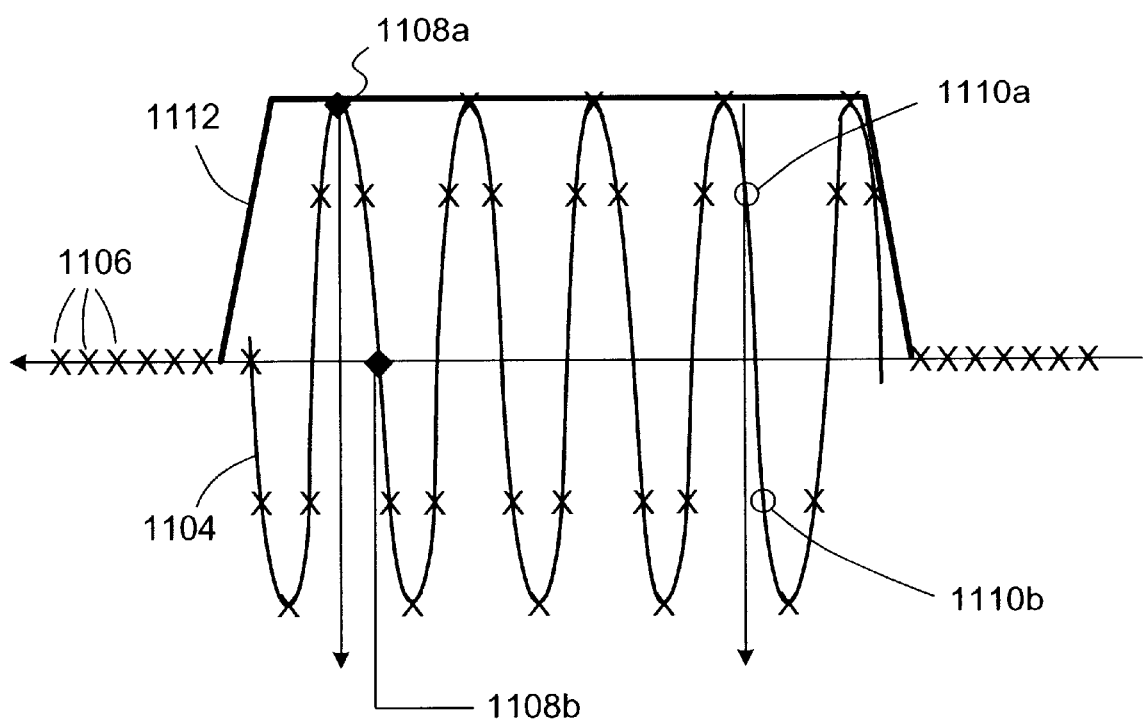
FIG. 11 illustrates sub-sampling the waveform according to the present invention.

To illustrate the point, FIG. 11 shows an exemplary received UWB impulse waveform 1104. During signal processing, the waveform is periodically sampled at each sampling point 1106. It is assumed that these samples occur such that Nyquist sampling rate is exceeded by a factor of 2 (i.e. a minimum of 4 samples across a single cycle of waveform 1104) or any multiple thereof. The samples 1106 must be close together in order to retain the frequency information unambiguously which drives the cross range resolution. If an image were formed from the set of all samples from the waveform 1104, a large array would be necessary for data processing, potentially much larger than required to meet the resolution requirements. Alternatively this large array may be larger than the number of available pixels for many display applications, such as handheld devices. Advantageously, if there exists a priori knowledge of the PZD interval, through factory calibration or self testing, the waveform can be subsampled, i.e., sampled at a rate less than the Nyquist rate. The sampling rate would then be commensurate with the resolution requirement for the application or the display resolution capability while still accurately measuring the PZD envelope at the desired point in the image.

However, to accurately depict the envelope-detected image, the display only needs to sample within the envelop of the waveform. For example, an image may be formed using only two PZD pairs. In FIG. 11, first P sample 1108a and first Z sample 1108b may be used in each received waveform to define one boundary of the envelope of the image. A second pair, shown as second P sample 1110a and second Z sample 1110b define a second boundary. For generating an image of the object for display, an envelope 1112 is generated using the PZD pairs 1108a,b and 1110a,b. Display pixels may be illuminated between the points corresponding to these pairs. In summary, the envelope-detected image has a much lower sampling requirement than the waveform itself. More pairs may be used, however, two pairs is generally sufficient. Therefore, image generation speed would benefit from a technique that requires less data to be processed.

Figure 12A:
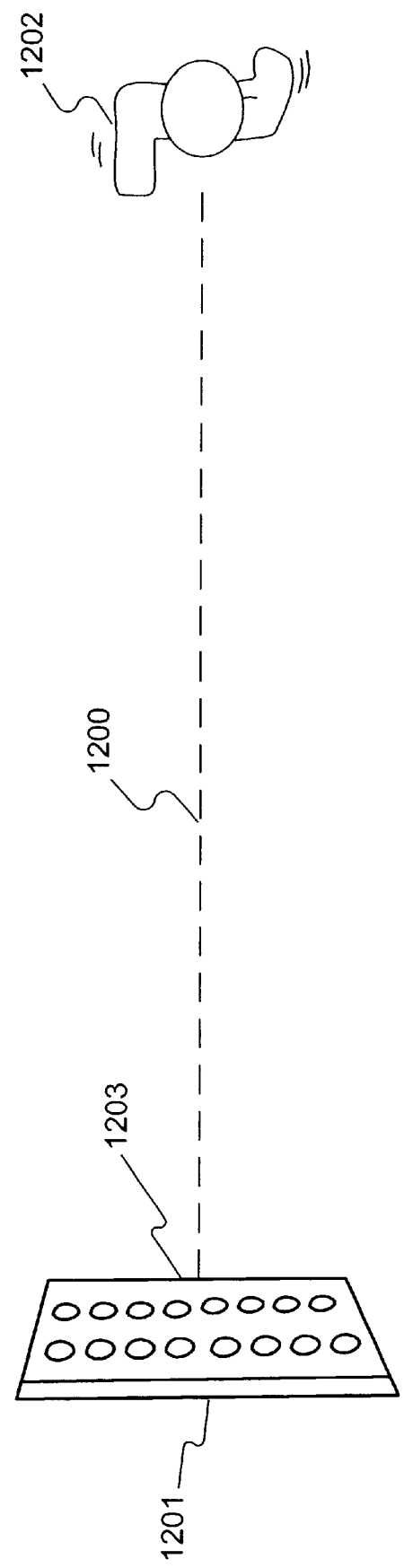
FIG. 12A illustrates an exemplary detection geometry in accordance with the present invention.

In imaging applications, such as the SAR back projection technique, multiple received waveforms 700 are used to create an envelope-detected image of the object. The description that follows corresponds to the geometry shown in FIG. 12A, wherein radar device 1201, illuminates and detects moving object 1202 (a moving human for example). An angle and distance from the object 1202 to the antenna array centroid 1203 defines a radial 1200. Similar radials may be defined from the object 1202 to each of the antenna elements depicted on antenna array 1203. In some cases these antenna elements may consist of a pair of elements, one element being for transmitting the UWB waveform 700 and the other element being for receiving the UWB waveform 700. In other cases a single element may act to both transmit and receive a UWB waveform 700. In either case, there exist unique radials between each object 1202 and each antenna element.

Figure 12B:
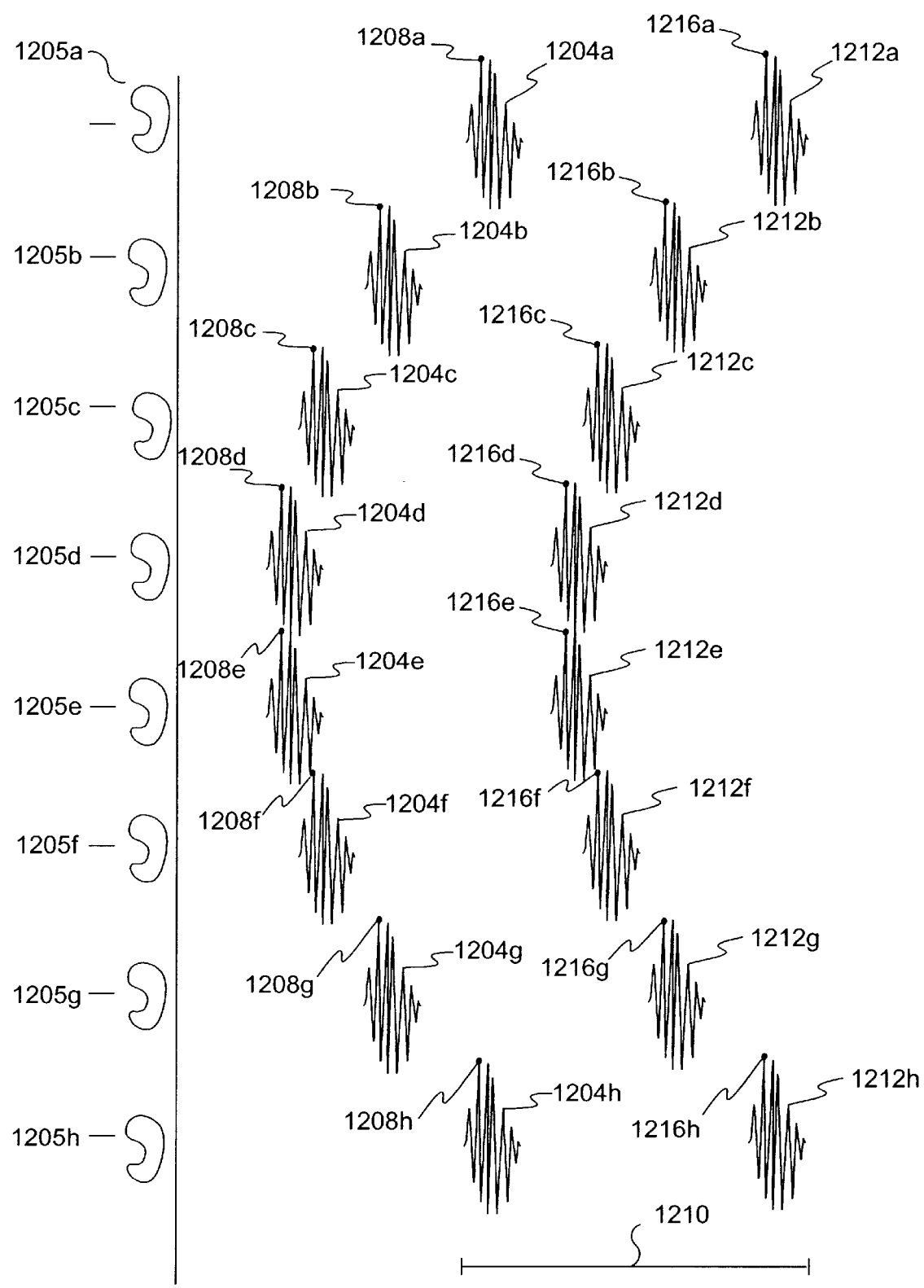
FIG. 12B depicts sampling and delaying received waveforms in a radar device in accordance with the present invention.

With reference now to FIG. 12B, a plurality of waveforms 1204*a–h* are received, each waveform 1204*a–h* being shifted in time proportional to the range from the object reflecting the energy to each antenna receive element 1205*a–h* of an antenna array. It should be noted that waveforms 1204*a–h* can be received along multiple radials from different objects located at different positions to the antenna array receive elements 1205*a–h*. For simplicity, FIG. 12B shows only a representative set of waveforms 1204*a–h*, received from the direction of a single radial 1200. The method described hereafter is therefore applicable across all such radials.

A waveform sample 1208*a–h* corresponding to an image pixel is selected on each of the waveforms 1204*a–h*. The waveform sample 1208*a* relates to a range from the object to the antenna 1205*a*. Corresponding waveform samples 1208*b–h* on each of the waveforms 1204*b–h* is likewise sampled. An intermediate image is then generated by summing the waveform samples 1208*a–h* of each waveform 1204*a–h*, and squaring this sum. This value will be referred to as the P value. Each waveform 1204*a–h* is duplicated and delayed uniformly by the PZD interval 1210. The delay may be effected by delaying each waveform 1204*a–h* separately, or, preferably, delayed simultaneously. Additionally, the waveform samples 1208*a–h* maybe delayed in time to ease processing costs. FIG. 12B shows delayed waveforms 1212*a–h*. Delayed waveform samples 1216*a–h*, again corresponding to image pixels, are selected in the delayed waveforms 1212*a–h*. A Z intermediate image is generated by summing the delayed waveform samples 1216*a–h* of each delayed waveform 1212*a–h*, and squaring this sum. This value is referred to as the Z value. An image of the entire PZD envelope is generated by adding the Z value and the P value and taking the square root The square root can be eliminated if the desire is to depict an image corresponding to power instead of voltage.

Figure 12C:
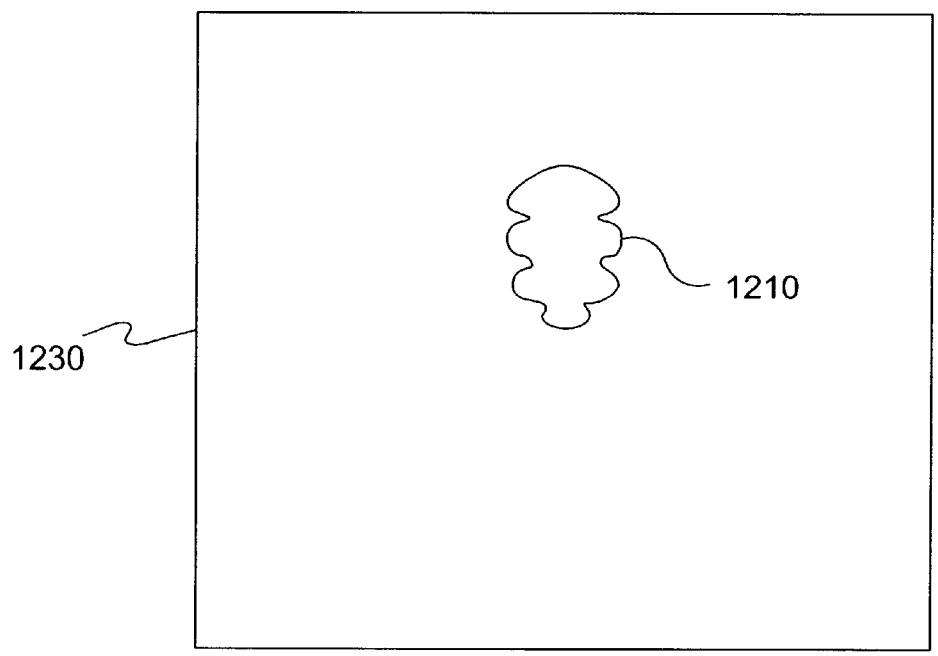
FIG. 12C depicts in image generated in accordance with the present invention.
Figure 12D:
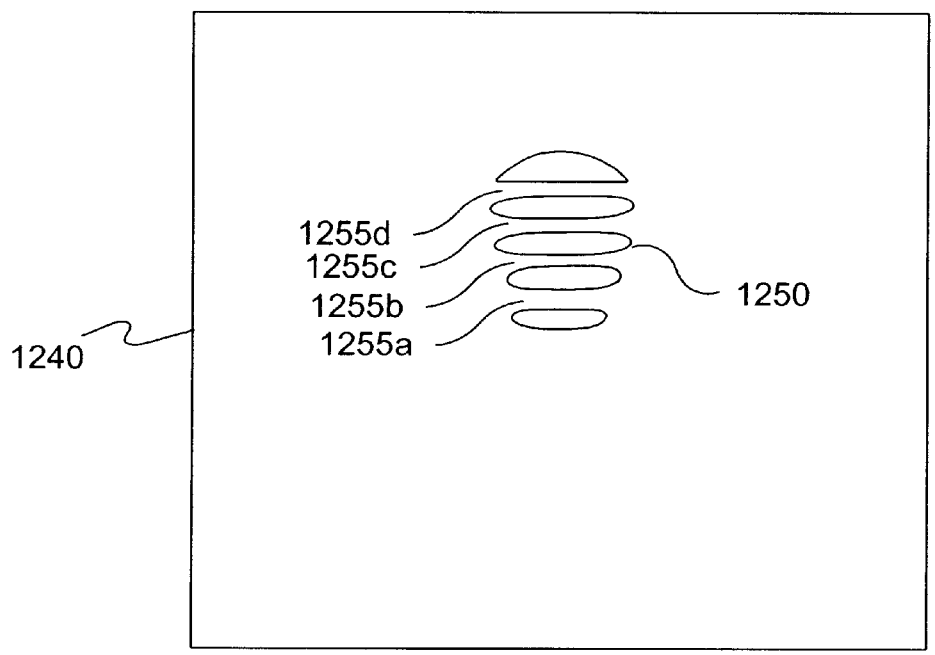
FIG. 12D depicts an image not generated in accordance with the present invention.

By delaying the waveforms 1204*a–h*, envelope detection is automatically performed along the radial of interest. With reference to FIG. 12C, the net result is an image 1210 shown on an exemplary image display 1230 where the detected object is represented by a more intuitive shape. In contrast, FIG. 12D shows the image 1250 of a detected object displayed on an exemplary image display 1240, said image being generated without using the PZD technique. Nulls 1255*a*, 1255*b*, 1255*c* and 1255*d* are shown.

It is preferable to perform the PZD envelop detection during image generation rather than signal processing because performing the envelope detection on the waveforms prior to generating the image would eliminate information about the center frequency and would be deleterious to noise suppression processing and the beamwidth of the image. It should be noted that the PZD technique is applicable to both synthetically scanned radars and to radar systems with a mechanically or electrically scanned antennas. Further, as would be apparent to those skilled in the art, these above-described techniques would be applicable to devices that employ a single transmit/receive antenna pair or a single switched transmit and receive antenna element where the device is moved to generate a synthetic aperture, or in any device where image processing uses time versus device position plots.

PZD processing may also be beneficially employed in less sophisticated sensors such as proximity detectors that are used in applications like stud-finding and motion detectors. Because of the reduced processing and storage requirement, such devices may be made for less cost.

For example, in a proximity detector, a PZD pair, or pairs, can be used to monitor the envelope at a specific range to detect a change by collecting a sequence of waveforms (even if there are only two samples per waveform) and eliminating the stationary signals that correspond to antenna coupling and other invariable reflections. These sampled ranges can be processed as if they are a sine and cosine pair to estimate the magnitude in the vicinity of the samples by $$mag = \sqrt{v_P^2 + v_Z^2}$$

where, $v_p$ corresponds to the amplitude measured for the peak reference point signal and $v_z$ corresponds to the amplitude for the zero reference signal. If the target's response has a long enough duration, multiple PZD pairs can be used to increase the confidence of the detection such as $$v_{wide} = \sqrt{(v_{P1}^2 + v_{Z1}^2) + (v_{P2}^2 + v_{Z2}^2)}$$

where ranges 1 and 2 are monitored by two different PZD pairs. Coupling the PZD processing with a sparse sampling can yield a well-behaved system response that can be easily sent to the threshold detector. Using multiple thresholds allows a level of target classification. For example, a stud finder may discriminate between a wood stud and a metal blocking plate due to the metal plate producing a much larger variation. Further classification can be extracted by monitoring two regions in order to extract coarse depth information which may help discriminate between a wood stud against drywall and a copper pipe that is in the middle of the wall. Yet, variations in the dielectric and varying thickness of different building materials are slight enough that the envelope detection is adequate to detect a stud using a single PZD pair.

Furthermore, precision timing information can be extracted by estimating the phase $\Phi$ relationship by $$\Phi = \tan^{-1}\left[\frac{v_P}{v_Z}\right] = \tan^{-1}\left[\frac{v_2}{v_1}\right]$$

However, this timing is phase shift based, and therefore provides only relative timing and is subject to the ambiguity from the multiple lobes of the pulse. Such phase processing would be very applicable to monitoring small movements such as breathing for remote patient observation. The changes in the phase angle could be filtered to define the respiratory rate. As would be apparent to one skilled in the art, use of this approach allows a cost sensitive system to monitor a very small number of ranges and effectively detect the desired response without having the periodic nulling associated with the target's response. This benefits the system by eliminating the need for variable or programmable delays and replacing them with a couple of fixed delays.

As described above and shown in the associated drawings, the present invention comprises a method for image envelope generation of an object reflecting ultra wideband signals. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A method for detecting an object reflecting impulse radar signals, comprising the steps of:
   a. receiving a reflected impulse waveform; and
   b. defining an envelope by finding a sum, said sum being found by adding a first square, said first square being the square of said reflected impulse waveform and a second square, said second square being the square of said reflected impulse waveform delayed in time by an interval, said interval being a difference in time between occurrence in said impulse waveform of the greatest energy displacement and an adjacent zero energy value.

2. The method according to claim 1, wherein said step of defining an envelope further comprises finding the square root of said sum.

3. The method according to claim 1, further comprising the step of storing said reflected impulse waveform upon reception of said reflected impulse waveform.

4. The method according to claim 3, wherein said step of storing said reflected impulse waveform is performed by obtaining samples of said reflected impulse waveform at a sampling rate, said sampling rate being less than the Nyquist rate.

5. In a radar apparatus, a method of displaying an image of an object, said object reflecting impulse radar signals, comprising the steps of:
   a. receiving a plurality of reflected impulse waveforms;
   b. obtaining first samples of each of said plurality of reflected impulse waveforms at a first sample point occurring in each of said plurality of reflected impulse waveforms;
   c. obtaining second samples by delaying each of said plurality of waveforms by an interval, said interval being a difference in time between occurrence in said impulse waveform of the greatest voltage displacement and the next-occurring zero voltage, and obtaining said second samples at said sample point in each delayed waveform; and
   d. defining an image envelope by finding a total sum, said total sum of a P value, said P value being a first square of a first sum of said first samples and a Z value, said Z value being a second square of a second sum of said second samples.

6. The method according to claim 5 wherein said step of defining an image envelope further comprises finding a square root of said first sum.

7. The method according to claim 5, wherein said step of obtaining second samples comprises delaying the values of the first samples, by said interval.

8. A method of detecting an object reflecting impulse radar signals, comprising the steps of:
   a. receiving a reflected impulse waveform; and
   b. defining an approximate envelope of said reflected impulse waveform by finding a sum, said sum being found by adding a first absolute value magnitude, said first absolute value magnitude being the absolute value magnitude of said reflected impulse waveform and a second absolute value magnitude, said second absolute value magnitude of said reflected impulse waveform delayed in time by an interval, said interval being a difference in time between occurrence in said impulse waveform of the greatest voltage displacement and the next-occurring zero voltage.

* * * * *